US010561956B2

(12) United States Patent
Barrett et al.

(10) Patent No.: US 10,561,956 B2
(45) Date of Patent: Feb. 18, 2020

(54) MOVEABLE MEMBER BEARING AERIAL VEHICLES AND METHODS OF USE

(71) Applicant: University of Kansas, Lawrence, KS (US)

(72) Inventors: Ronald M. Barrett, Lawrence, KS (US); Richard B. Bramlette, Little Rock, AR (US); Robert B. Honea, Lenoir City, TN (US)

(73) Assignee: University of Kansas, Lawrence, KS (US)

( * ) Notice: Subject to any disclaimer, the term of this patent is extended or adjusted under 35 U.S.C. 154(b) by 1209 days.

(21) Appl. No.: 14/810,090

(22) Filed: Jul. 27, 2015

(65) Prior Publication Data

US 2016/0023759 A1 Jan. 28, 2016

(51) Int. Cl.
*B64C 27/00* (2006.01)
*A63H 27/00* (2006.01)
*B64C 27/08* (2006.01)
*B64C 27/20* (2006.01)

(52) U.S. Cl.
CPC .............. *A63H 27/12* (2013.01); *B64C 27/00* (2013.01); *B64C 27/006* (2013.01); *B64C 27/08* (2013.01); *B64C 27/20* (2013.01)

(58) Field of Classification Search
CPC .......... A63H 27/00; A63H 27/12; B64B 1/24; B64B 1/30; B64B 1/32; B64B 1/34; B64C 27/00; B64C 27/006; B64C 27/08; B64C 27/20; B64C 39/00; B64C 39/02; B64C 39/024; B64C 39/028; B64C 2201/024; B64C 2201/108; B64C 33/00; B64C 33/02
See application file for complete search history.

(56) References Cited

U.S. PATENT DOCUMENTS

| 2,678,783 | A | 5/1954 | Myers |
| 2,845,746 | A | 8/1958 | McKinney |
| 3,578,263 | A | 5/1971 | Gunter et al. |
| 3,884,431 | A | 5/1975 | Burrell |
| 5,060,886 | A | 10/1991 | Davis et al. |
| 5,082,079 | A | 1/1992 | Lissaman et al. |
| 5,289,994 | A | 3/1994 | Del Campo Aguilera |
| 6,260,796 | B1 | 7/2001 | Klingensmith |
| 6,502,787 | B1 | 1/2003 | Barrett |
| D500,809 | S | 1/2005 | McKenna et al. |

(Continued)

FOREIGN PATENT DOCUMENTS

| CN | 10205022 | 5/2011 |
| WO | WO 13/048339 | 4/2013 |
| WO | WO 14/055899 | 4/2014 |

OTHER PUBLICATIONS

U.S. Appl. No. 14/120,446, filed Jun. 10, 2014, Barrett et al.

(Continued)

*Primary Examiner* — Richard R. Green
*Assistant Examiner* — Michael A. Fabula
(74) *Attorney, Agent, or Firm* — Ray Quinney & Nebeker P.C.; Paul N. Taylor

(57) ABSTRACT

An aerial vehicle includes a body having a longitudinal axis, a plurality of movable members emanating connected to the body, at least one motor, and at least three aerodynamic propulsors driven by the at least one motor. The movable members are connected to the body and extend away from the body.

22 Claims, 36 Drawing Sheets

(56) References Cited

U.S. PATENT DOCUMENTS

| | | | |
|---|---|---|---|
| 7,273,195 B1* | 9/2007 | Golliher | A63H 27/12 244/17.11 |
| 7,874,513 B1 | 1/2011 | Smith | |
| 8,147,289 B1* | 4/2012 | Lee | A63H 27/12 446/36 |
| D697,145 S * | 1/2014 | Wong | D21/436 |
| 9,399,982 B2* | 7/2016 | Austin | F03D 3/02 |
| 9,457,901 B2* | 10/2016 | Bertrand | A63H 27/12 |
| 9,601,040 B2* | 3/2017 | Barrett | G09F 21/08 |
| 10,002,342 B1* | 6/2018 | Oikarinen | G06Q 10/087 |
| 2002/0030142 A1 | 3/2002 | James | |
| 2006/0038061 A1* | 2/2006 | Blevio, Sr. | B64C 25/32 244/23 A |
| 2010/0152933 A1 | 6/2010 | Smoot et al. | |
| 2010/0224723 A1* | 9/2010 | Apkarian | A63H 27/12 244/65 |
| 2010/0252690 A1 | 10/2010 | Hothi et al. | |
| 2011/0001020 A1 | 1/2011 | Forgac | |
| 2011/0042509 A1 | 2/2011 | Bevirt et al. | |
| 2011/0168835 A1 | 7/2011 | Oliver | |
| 2011/0226892 A1* | 9/2011 | Crowther | B64C 1/30 244/17.23 |
| 2012/0286102 A1 | 11/2012 | Sinha et al. | |
| 2014/0034775 A1* | 2/2014 | Hutson | B64C 39/024 244/17.17 |
| 2014/0034776 A1* | 2/2014 | Hutson | B64D 45/00 244/17.17 |
| 2014/0117149 A1 | 5/2014 | Zhou et al. | |
| 2014/0131507 A1 | 5/2014 | Kalantari et al. | |
| 2014/0131510 A1 | 5/2014 | Wang et al. | |
| 2014/0319266 A1* | 10/2014 | Moschetta | B64C 25/36 244/13 |
| 2014/0339355 A1* | 11/2014 | Olm | B64C 27/08 244/17.23 |
| 2015/0298799 A1* | 10/2015 | Bertrand | A63H 27/12 701/23 |
| 2015/0307191 A1* | 10/2015 | Samuel | B64C 33/02 244/22 |
| 2016/0001875 A1* | 1/2016 | Daler | B64C 17/00 244/17.23 |
| 2016/0009381 A1* | 1/2016 | Benatar | B64C 25/34 244/103 R |
| 2016/0010627 A1* | 1/2016 | Austin | F03D 3/02 290/55 |
| 2016/0016652 A1* | 1/2016 | Barrett | B64C 25/06 244/15 |
| 2016/0023743 A1* | 1/2016 | Barrett | G09F 21/08 244/119 |
| 2016/0137293 A1* | 5/2016 | Santangelo | B64C 39/024 244/50 |
| 2016/0185455 A1* | 6/2016 | Deng | B60L 1/00 310/38 |

OTHER PUBLICATIONS

U.S. Appl. No. 14/120,447, filed Jun. 20, 2014, Barrett et al.
U.S. Appl. No. 14/120,448, filed Jun. 24, 2014, Barrett et al.
U.S. Appl. No. 14/120,449, filed Jul. 25, 2014, Barrett et al.
U.S. Appl. No. 14/734,864, filed Jun. 9, 2015, Barrett et al.
U.S. Appl. No. 14/734,885, filed Jun. 9, 2015, Barrett et al.
U.S. Appl. No. 29/529,811, filed Jun. 10, 2015, Barrett et al.
U.S. Appl. No. 29/529,831, filed Jun. 10, 2015, Barrett et al.
U.S. Appl. No. 29/546,239, filed Nov. 20, 2015, Barrett et al.
Leishman, J. G., "Principles of Helicopter Aerodynamics," Cambridge University Press, New York, NY, USA 2000.

* cited by examiner

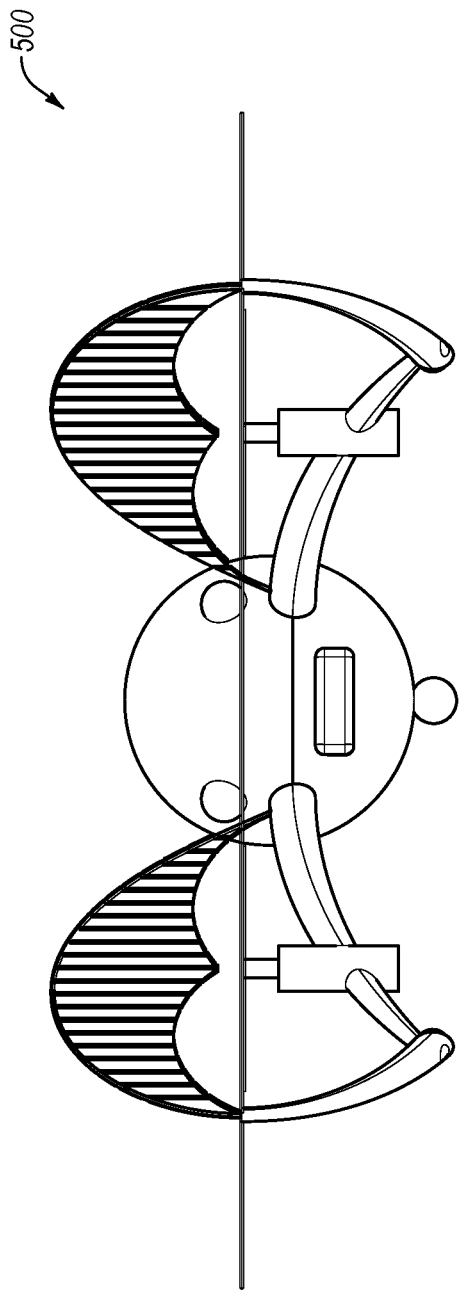
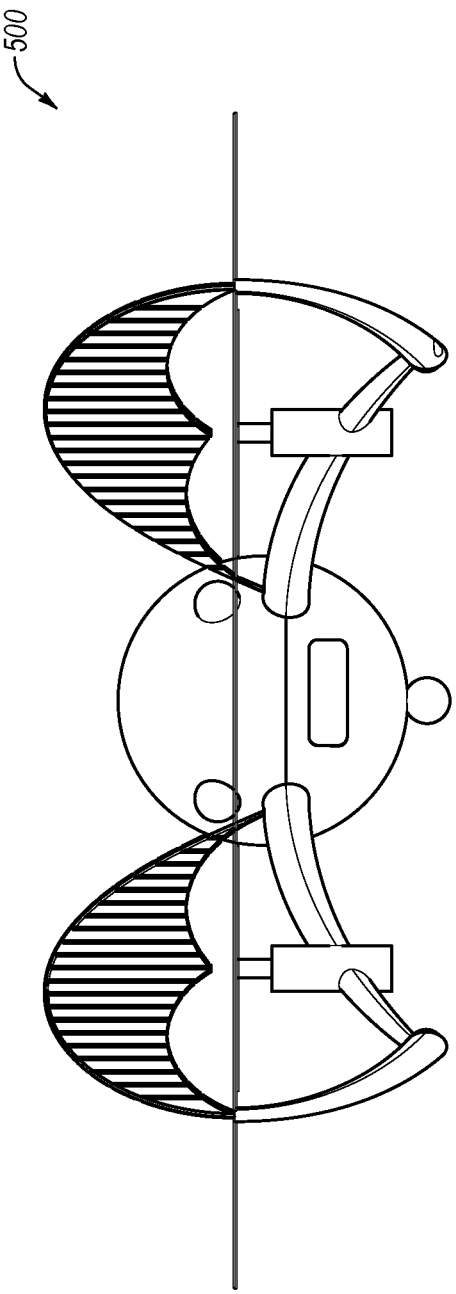

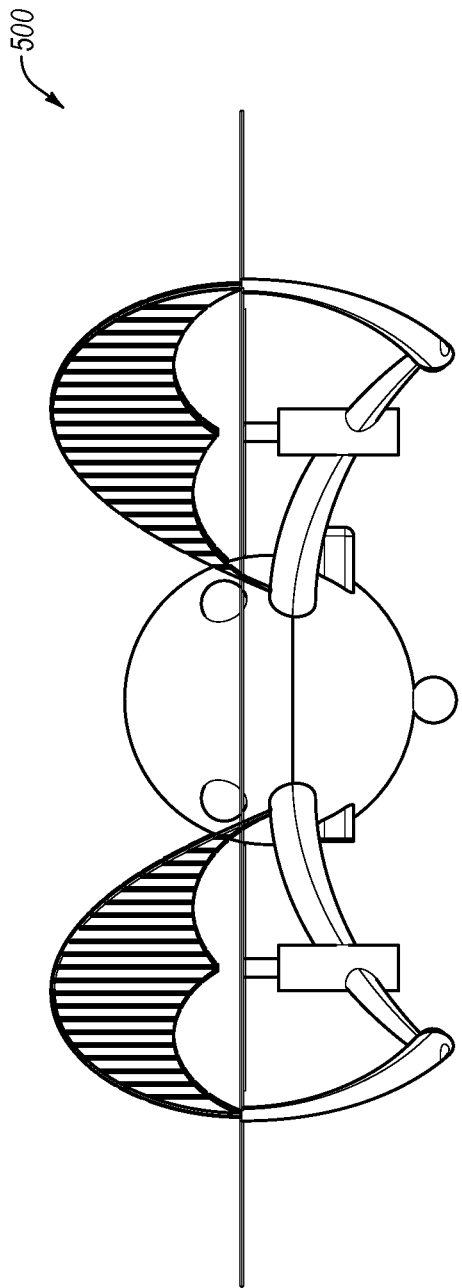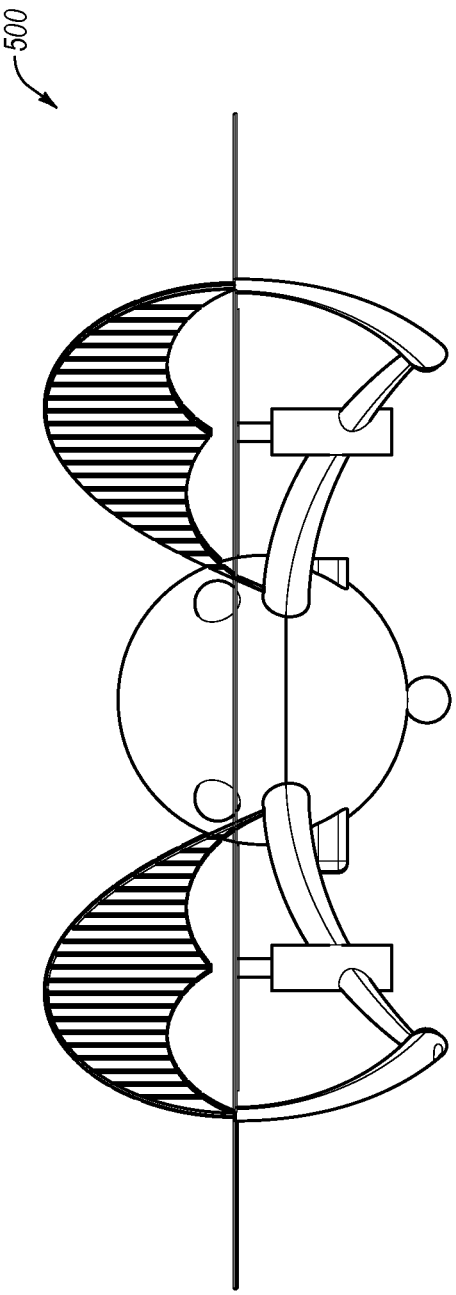

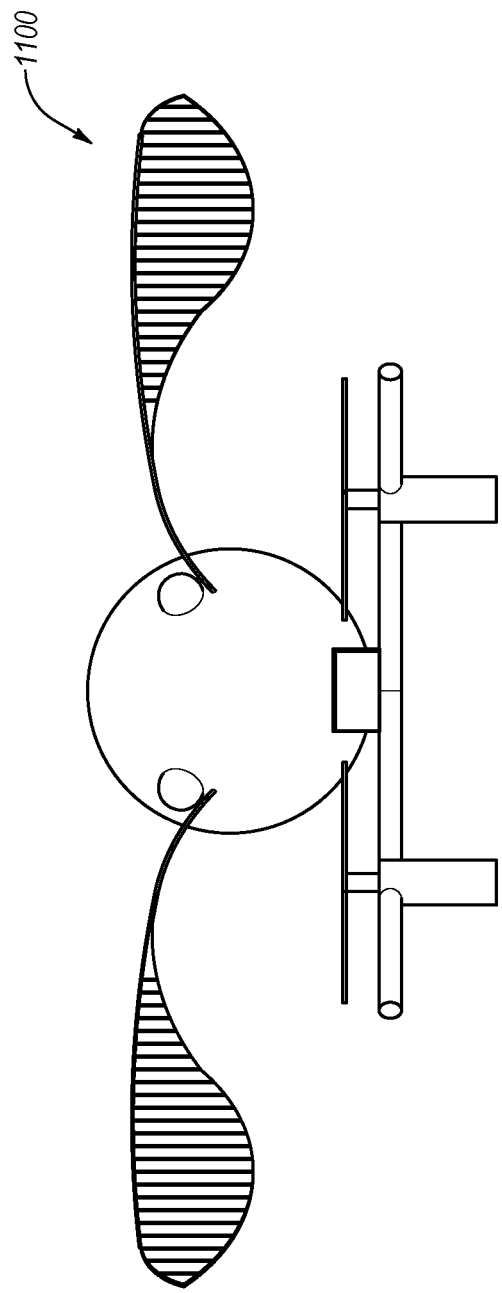
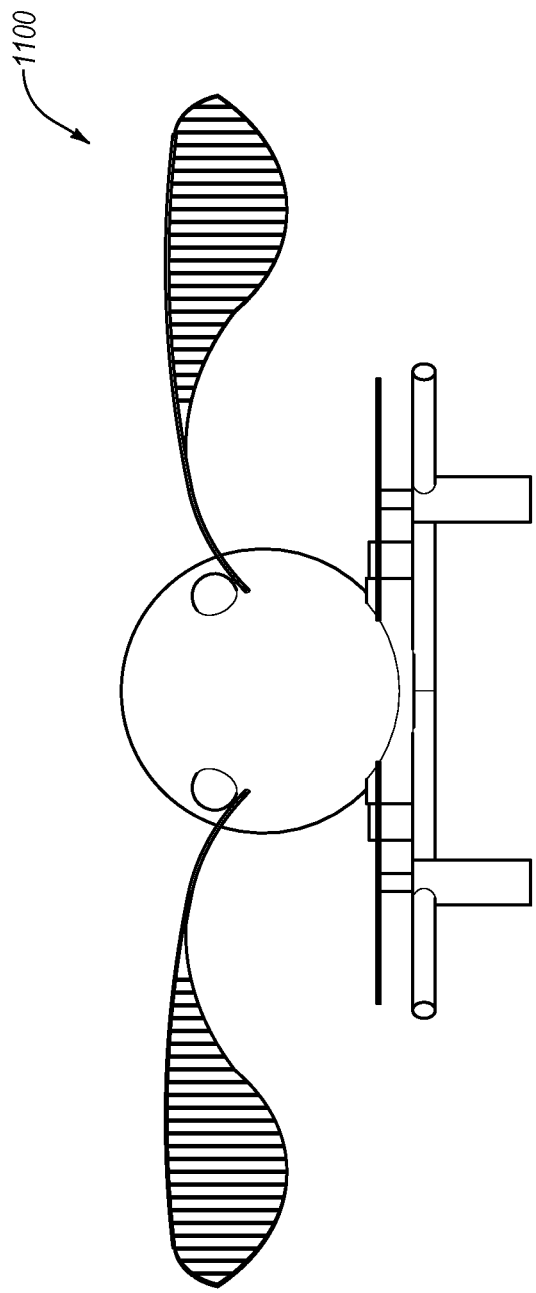
Fig. 14B
Fig. 14C

MOVEABLE MEMBER BEARING AERIAL VEHICLES AND METHODS OF USE

GOVERNMENTAL RIGHTS

This invention was made with government support under grant no. DTOS59-06-G-00047 awarded by the Department of Transportation. The government has certain rights in the invention.

CROSS-REFERENCE TO RELATED APPLICATIONS

This application is a continuation in part of U.S. application Ser. No. 14/20,449, filed Jul. 25, 2014, and entitled "FEATHER-BEARING BALL AERIAL VEHICLES AND METHODS OF USE," the disclosure of which is incorporated herein by this reference.

BACKGROUND

1. Field of the Disclosure (Technical Field)

The disclosure is concerned with aerial vehicles. More particularly, pertains to a class of flying toys and promotional aircraft which are able to hover like helicopters, using a plurality of propellers for lift and flight control with a body which is primarily spherical in shape and wing appendages.

2. Background

For more than two centuries, multi propeller aircraft have been experimented with, starting with the fabled toy of Launoy and Bienvenu of 1783. These devices were and are limited mostly to hover-type flight modes, flying at low speeds for limited endurances and distances.

A number of flying toys are shaped like space ships, rockets, and/or conventional full-scale aircraft. Some fiction writers have conceived flying objects which are currently well beyond the ability of technology to fully realize. Among them are aircraft which use flapping feathers for locomotion and flight control. Currently, there exists no subscale powerplant which is strong enough to move such individual flight feathers fast enough to lift an aerial vehicle for either locomotion or flight control. One of the major difficulties with using single or low numbers of feathers for flight is that root relieving effectively destroys the lift distribution over the feather root and body. A feather arrangement will necessarily consume orders of more power per unit lift with respect to a conventional aircraft.

Conventional aerial vehicles use a propeller guard to limit or prevent catastrophic propeller damage. Conventional propeller guards may be heavy and may induce even greater levels of cross-flow drag and pitchback instability. Additionally, conventional training cross-arms are added to the landing gear at the bottom of the aircraft, thereby allowing the customer to learn how to fly the aerial vehicle. While partially protecting the aerial vehicle from downward strikes, conventional training cross-arms the aerial vehicle can be easily flipped over, inducing propeller damage. Conventional training cross-arms may be exceedingly heavy and draggy as they lie directly in the propwash close to the ground, which compromises maneuverability. The great weight of cross-arms also leads to a net downward shift in center of gravity which exacerbates pendulum instabilities.

SUMMARY OF THE DISCLOSURE

This summary is provided to introduce a selection of concepts that are further described below in the detailed description. This summary is not intended to identify key or essential features of the claimed subject matter, nor is it intended to be used as an aid in limiting the scope of the claimed subject matter.

An embodiment of an aerial vehicle includes a body, at least one motor, at least three aerodynamic propulsors, a plurality of support members, and one or more movable members. The body has a longitudinal axis and the at least three aerodynamic propulsors are positioned relative to the longitudinal axis to provide lifting thrust, pitch, yaw and roll control. The plurality of support members structurally support the at least three aerodynamic propulsors relative to the body. The one or more movable members are affixed to the body or support members of the vehicle and move at least within a plane orthogonal to the longitudinal axis.

Another embodiment of an aerial vehicle includes an undercarriage assembly, at least one motor, at least three aerodynamic propulsors, an electronics package, and one or more movable members. The undercarriage assembly has a longitudinal axis and the at least three aerodynamic propulsors are positioned relative to the longitudinal axis to provide lifting thrust, pitch, yaw and roll control. The undercarriage assembly structurally supports the at least three aerodynamic propulsors relative to the longitudinal axis. The electronics package includes a stability augmentation system in data communication with the at least one motor. The one or more movable members are affixed to the undercarriage assembly and move at least within a plane orthogonal to the longitudinal axis.

Yet another embodiment of an aerial vehicle includes an undercarriage assembly, at least one motor, at least three aerodynamic propulsors, a propulsor guard, a domed support member, and one or more movable members. The undercarriage assembly has a longitudinal axis and the at least three aerodynamic propulsors are positioned relative to the longitudinal axis to provide lifting thrust, pitch, yaw and roll control. The undercarriage assembly structurally supports the at least three aerodynamic propulsors relative to the longitudinal axis. The propulsor guard is connected to the undercarriage assembly and extends circumferentially about a perimeter of the undercarriage assembly. The domed support member is connected to the undercarriage assembly and configured to transfer loads to the undercarriage assembly. The one or more movable members are affixed to the undercarriage assembly and move at least within a plane orthogonal to the longitudinal axis.

Additional features and advantages of exemplary implementations of the disclosure will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the disclosure can be obtained, a more particular description will be rendered by reference to specific embodiments thereof which are illustrated in the appended drawings. For better understanding, like elements have been designated by like reference numbers throughout the various accompanying figures. Though some elements in some figures have the same reference number as elements in other figures, these elements may be the same or may differ. While some of the drawings are schematic representations of concepts, at least some of the drawings may be drawn to scale. Understanding that these drawings depict only typical embodiments of the disclosure and are not therefore to be considered to be limiting of its scope, the embodiments will be described and explained with additional specificity and detail through the use of the accompanying drawings in which:

FIG. 7B is a front view of the aerial vehicle of FIG. 7A;
FIG. 7C is a back view of the aerial vehicle of FIG. 7A;
FIG. 7D is a left view of the aerial vehicle of FIG. 7A;
FIG. 7E is a right view of the aerial vehicle of FIG. 7A.

FIG. 14B is a front view of the aerial vehicle of FIG. 14A;
FIG. 14C is a side view of the aerial vehicle of FIG. 14A.

DETAILED DESCRIPTION

Figure 1:
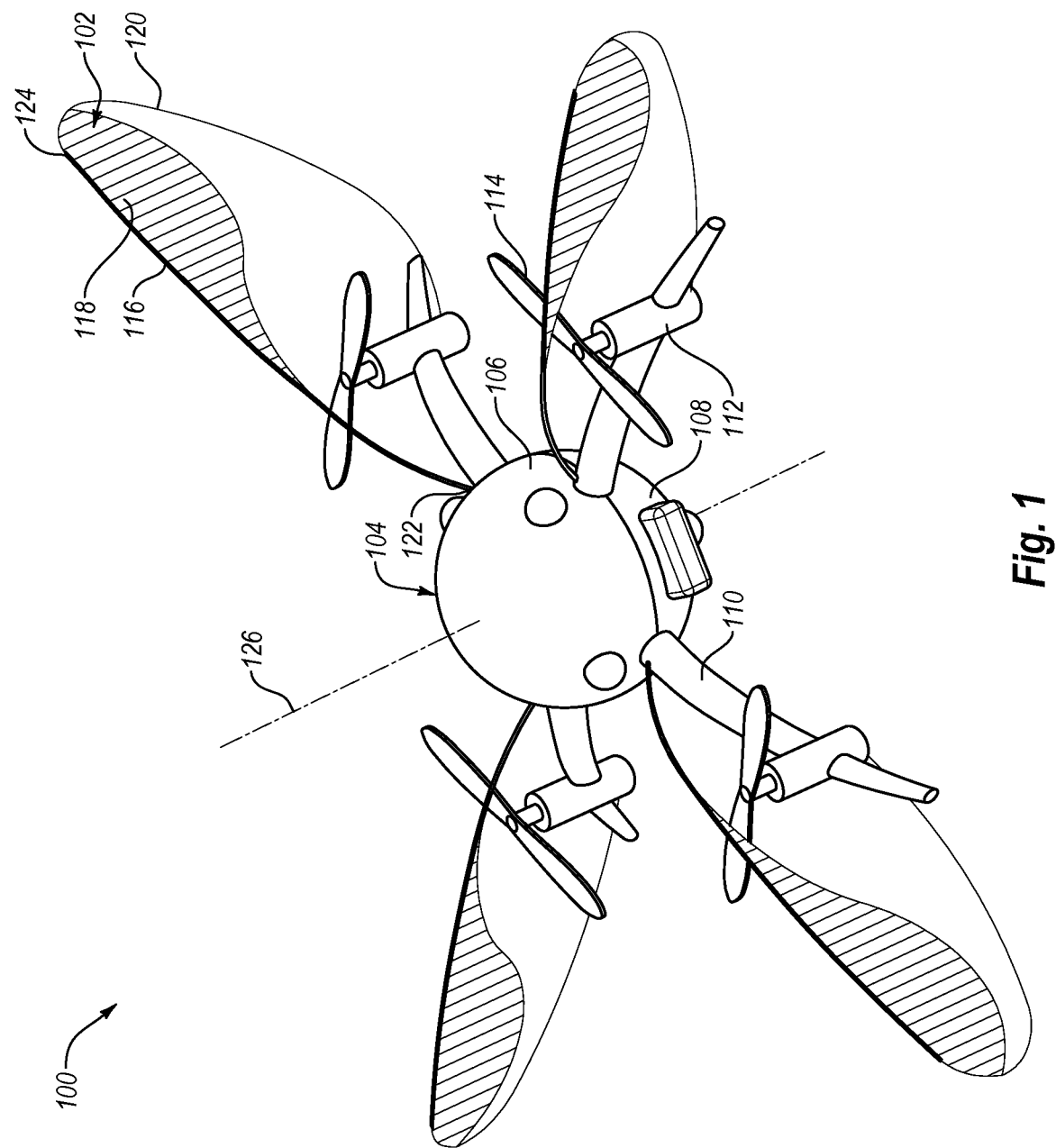
FIG. 1 is a perspective view of an embodiment of an aerial vehicle having movable members, according to the present disclosure.

One or more specific embodiments of the present disclosure will be described below. These described embodiments are examples of the presently disclosed techniques. Additionally, in an effort to provide a concise description of these embodiments, not all features of an actual implementation may be described in the specification. It should be appreciated that in the development of any such actual implementation, as in any engineering or design project, numerous implementation-specific decisions will be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to aerial vehicles that may imitate the flapping or other flight movement of real or fantasy animals or machines. In some embodiments, an aerial vehicle may include one or more aerodynamic propulsors to move air and provide a lifting thrust. The movement of the aerodynamic propulsors and/or the air moved by the aerodynamic propulsors may be utilized to replicate flight movement such as flapping, fluttering, vibrations, undulations, waving, other movements, or combinations thereof.

A flexible, movable assembly may be supported by a structural arch that doubles as a propulsor guard on an aerodynamic propulsor. A cage may be formed around the aerodynamic propulsor, which may utilize the movement of the aerodynamic propulsor to move the flexible, movable assembly to mimic the action of a flapping feather. The cage may also protect the rotor from striking objects. A flexible, movable assembly made from reflective, colored, or other visible material may enhance visibility of the aerial vehicle as the flexible, movable assembly may reflect and scatter incident light. A flexible, movable assembly may prevent one or more parts of the aerodynamic propulsor, such as spinning rotor blades, from striking people, animals, or other vulnerable objects should the aircraft run into a person or animal or crash.

Increased lateral projected area of a hovering aerial vehicle may lead to increased cross-flow drag levels, which may induce pitchback instabilities. By using thin structural arch materials which support a segmented and/or flexible movable assembly, the total crossflow drag levels may be mitigated. These lower crossflow drag levels allow the aerial vehicle to be more stable and to move at increased rates with lower drag levels when in a hover or vertical climb modes compared to aerial vehicles with greater crossflow drag levels. Because the inner surfaces of the structural arches may be connected to a web of the movable assembly, the web itself can act as a further strengthening, stiffening structural member as the web increases the area bending moments of inertia of the arch.

An aerial vehicle according to the present disclosure may include one or more safety features to mitigate or prevent the risk of injury to people, animals, and other objects. The movable assembly may be integrated into an arch shape which acts as a "doubled" training cross-bar in that it protects the aircraft not only from striking the ground and walls, but from hitting objects above like the ceiling or if flipped over. The area bending moment of inertia may be increased over that of a conventional single cross-arm assembly of the same mass by using a lightweight structural arch. Accordingly, the arch assembly may protect the aircraft from crashes; protect objects and bystanders from one or more parts of the aerodynamic propulsor, such as spinning rotor blades; support one or more movable assemblies; and increase a strength-to-weight ratio of the aerial vehicle.

Although the structural arches and/or movable assemblies may be described herein in various embodiments, structural arches and/or movable assemblies may range in maximum dimension from 2 millimeters (mm) to 5 meters (m) in overall span. Similarly, a body of the aerial vehicle may range from 2 millimeters (mm) to 5 meters (m) in diameter.

FIG. 1 shows an embodiment of an aerial vehicle 100 with movable members 102 and a body 104. The body 104 is shown in FIG. 1 as being spherical. Because multi-propeller aerial vehicles may be sensitive to changes in a takeoff weight to empty weight ratio when dimensions are small, at least one embodiment of an aerial vehicle 100 may include a spherical body 104, which may reduce gross weight. In some embodiments, an upper body 106 may join to a lower body 108. The upper body 106 and lower body 108 may be structurally bonded to each other or mated through a variety of mechanisms including thin film members, hinges, thermal-welding and/or mechanical fasteners. In other embodiments, the body 104 may be a single piece may it affixed to an undercarriage assembly 110. The undercarriage assembly 110 may support one or motors 112 and/or a plurality of aerodynamic propulsors 114, which may be driven by the one or motors 112.

In some embodiments, the movable members 102 may radiate from the body 104. In other embodiments, the movable members 102 may be connected to the undercarriage assembly 110. In yet other embodiments, the movable members 102 may be connected to another part of the aerial vehicle 100. The movable members 102 may be arranged in any configuration.

The movable members 102 may be movable relative to the body 104 and/or undercarriage assembly 110 by one or more mechanisms including a flexible member, a hinge, a movable connection, other mechanisms, or combinations thereof. In some embodiments, the movable member 102 may include a flexible member 116 that extends from the body 104. The flexible member 116 may be resilient to bend and flex during movement of the aerial vehicle 100 during operation and return to an original position. The flexible member 116 may be made of or include a metal, metal alloy, polymer, wood, composite, carbon fiber. In at least one embodiment, the flexible member 116 may be made of or include a superelastic (i.e., shape-memory) material such as nickel titanium alloy or a shape-memory polymer. In some embodiments, the flexible member 116 may provide a resilient and flexible structure from which a sheet 118 may extend. The sheet 118 may be flexible or may be substantially rigid such that the sheet 118 may move as the flexible member 116 flexes and moves relative to the body 104 and/or undercarriage assembly. The sheet 118 may be or include a reflective material that increases visibility of the movable member 102 when the sheet 118 moves during operation. In some embodiments, the sheet 118 may be made of or include a metal, metal alloy, polymer, composite, carbon fiber, textile, other material, or combinations thereof. In at least one embodiment, the sheet 118 may be made of or include biaxially-oriented polyethylene terephthalate (i.e., MYLAR). The sheet 118 may be substantially continuous, have a plurality of segments, have a plurality of cuts and/or perforations therein to create a "feathered" texture, or combinations thereof. For example, the cuts and/or perforations may form slots, which may be planar or curvilinear to mimic different shapes. The upper bond lines of the sheet 118 of the movable member 102 may take the form of a teardrop cross section for drag minimization and strain relief. They may also support a partially contiguous root section of the movable member 102 which would in turn provide structural stiffening effect to the movable member 102.

The movable member 102 may include an aft connection member 120 aft of the flexible member 116 that connects the flexible member 116 to the body 104 and/or undercarriage assembly 110. In some embodiments, the aft connection member 120 may be aft of the sheet 118. In other embodiments, the aft connection member 120 may at least partially longitudinally overlap the sheet 118. In at least one embodiment, the flexible member 116 may extend from the body 104 and the aft connection member 120 may connect the flexible member 116 to the undercarriage assembly 110. In yet other embodiments, the flexible member 116 may connect to the body 104 and/or undercarriage assembly 110 at both a first end 122 and a second end 124 of the flexible member 116 and may be substantially continuous therebetween.

The one or more movable members 102 may be distributed about a longitudinal axis 126 of the aerial vehicle 100. The longitudinal axis 126 may be defined by extending through body 104 and/or undercarriage assembly 110 of the aerial vehicle 100 in the longitudinal direction. The one or more aerodynamic propulsors 114 may provide thrust substantially in the longitudinal direction. In some embodiments, the one or more movable members 102 may be distributed about the longitudinal axis 126 at equal angular intervals. For example, the aerial vehicle 100 depicted in FIG. 1 shows four movable members 102 spaced at 90° intervals relative to one another about the longitudinal axis 126. In another example, an aerial vehicle 100 having three movable members 102 may have the movable members spaced at 120° intervals relative to one another about the longitudinal axis 126.

The plurality of aerodynamic propulsors 114 may be distributed about a longitudinal axis 126 of the aerial vehicle 100. In some embodiments, the plurality of aerodynamic propulsors 114 may be distributed about the longitudinal axis 126 at equal angular intervals. For example, the aerial vehicle 100 depicted in FIG. 1 shows four aerodynamic propulsors 114 spaced at 90° intervals relative to one another about the longitudinal axis 126. In another example, an aerial vehicle 100 having three aerodynamic propulsors 114 may have the movable members spaced at 120° intervals relative to one another about the longitudinal axis 126.

In some embodiments, at least one of the one or more movable members 102 may be located on the aerial vehicle 100 and rotationally aligned about the longitudinal axis with at least one of the plurality of aerodynamic propulsors 114. For example, FIG. 1 depicts an aerial vehicle 100 having four movable members 102 that are rotationally aligned with four aerodynamic propulsors 114. As the aerodynamic propulsors 114 generate thrust to move the aerial vehicle 100, the movement of the air may effect movement of the movable members 102.

In some embodiments, the flexible member 116 of the one or more movable members 102 may extend from the body 104 and/or undercarriage assembly 110 outward to the radially outermost point of the aerial vehicle 100. The flexible member 116 may, therefore, extend radially beyond the aerodynamic propulsors 114 and may form a protective propulsor guard. In some embodiments, a variation in flexural stiffness may be desirable as a function of span, such that the flexible member 116 may have a varying flex response along a length thereof. For example, the flexible member 116 may be thickest and/or strongest near the first end 122 of the flexible member 116 to provide additional reinforcement near the body 104 and/or undercarriage assembly 110. In another example, the flexible member 116 may be thinnest and/or softest near the second end 124 to reduce an inertial moment of the aerial vehicle or to enhance the movement of the movable member 102 during operation.

The reinforced movable members 102 having flexible members 116 providing reinforcement may expand the flexural moments of inertia, thereby making the aerial vehicle 100 more robust per unit weight than a conventionally configured multi-propeller aircraft. The sheets 118 may reduce the crossflow drag component as the profile of the flexible members 116 would typically be elliptical, although the flexible members 116 may have other cross-sectional profiles including square, rectangular, triangular, polygonal, irregular, or combinations thereof. By attaching the sheet 118 to the trailing edge of the flexible member 116, the profile approaches that of a structural teardrop, in cross-section which may reduce vertical and/or crossflow drag components. Because the mass of aerial vehicles described herein will be lower than a conventionally configured multi-propeller aircraft, aerial vehicles described herein may cost less, and may be more robust as inertial loads during object strike may be lower. Product safety may be similarly enhanced beyond those levels which are provided by the unique undercarriage arrangement.

Figure 2:
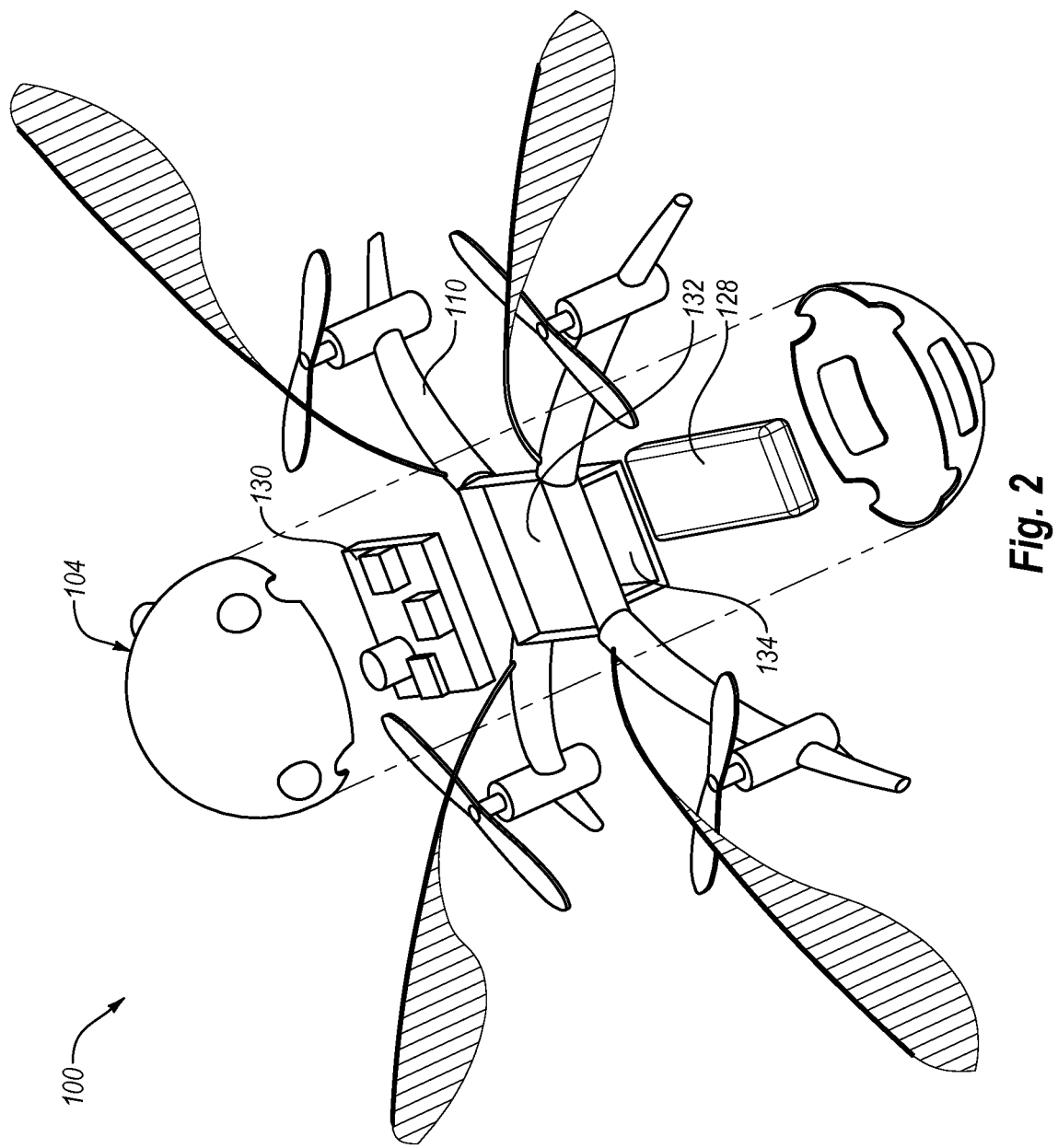
FIG. 2 is an exploded perspective view of the embodiment of the aerial vehicle of FIG. 1, according to the present disclosure.

FIG. 2 illustrates an exploded view of the aerial vehicle 100 of FIG. 1. As shown in FIG. 2, the aerial vehicle 100 may be powered by at least one energy storage mechanism 128 which may be removable and/or replaceable, in some embodiments. In other embodiments, the at least one energy storage mechanism 128 may be integrated with one or more aircraft systems and/or subsystems, such as an electronics package 130. For example, the at least one energy storage mechanism 128 may be permanently affixed to the electronics package 130 or other part of the aerial vehicle 100 and may be rechargeable. In some embodiments, the at least one energy storage mechanism 128 and electronics package 130 may be removable and/or replaceable together.

The electronics package 130 may be in data communication with the one or more motors 112 and/or one or more aerodynamic propulsors 114. In some embodiments, the electronics package 130 may include a guidance system, navigation system, control system, communications module, other electronic systems, or combinations thereof. In some embodiments, the electronics package 130 may be positioned to provide proper mass balance to the aerial vehicle 100. The electronics package 130 may include a plurality of sensors and/or light emitting protrusions. Sensors mounted on the underside of the aerial vehicle 100 may also be used for determination of altitude and/or proximity to obstacles and/or people.

The electronics package 130 fits within the electronics bay 132, which structurally transfers loads from the undercarriage assembly 110 to the electronics package 130 and the body 104. In some embodiments, the undercarriage assembly 110 may include a distinct energy storage mechanism bay 134 which may accommodate the at least one energy storage mechanism 128. In some embodiments, a separate electronics bay 132 and energy storage mechanism bay 134 may allow distribution of mass (and therefore balance) within the aerial vehicle 100 and also facilitate cooling of the components during uses. In other embodiments, a separate electronics bay 132 and energy storage mechanism bay 134 may allow for modifications and/or customizations of the device for varying applications.

A spherical body 104 may protect the electronics package 130 using minimal mass. The spherical body 104 may accept impact loads during inverted crash events. A spherical body 104 may minimize the external surface area while maximizing the internal volume. Because the aerial vehicle 100 may fly in any direction, thereby generating crossflow drag components from any quarter, the spherical body 104 minimizes multidirectional drag. While the aerial vehicle 100 is described as having a spherical body 104, it should be understood that the body 104 may take many forms including cubic, cylindrical, rectangular prism, triangular prism, tetrahedral, other polygonal volume, other polygonal prisms, other elliptical prisms, irregular shapes, or combinations thereof.

Figure 3:
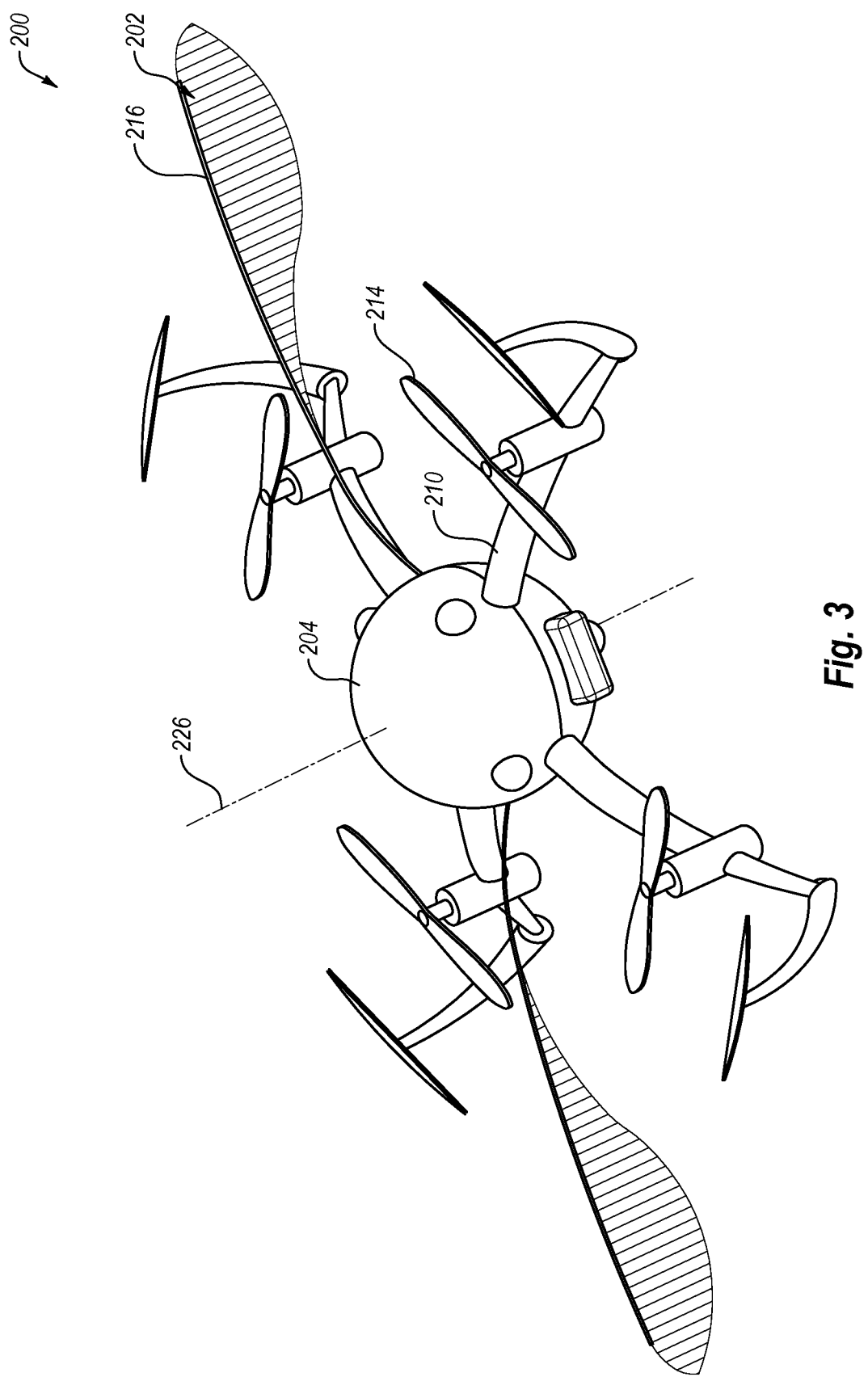
FIG. 3 is a perspective view of an embodiment of an aerial vehicle having movable members located angularly between aerodynamic propulsors, according to the present disclosure.
Figures 1, 4:
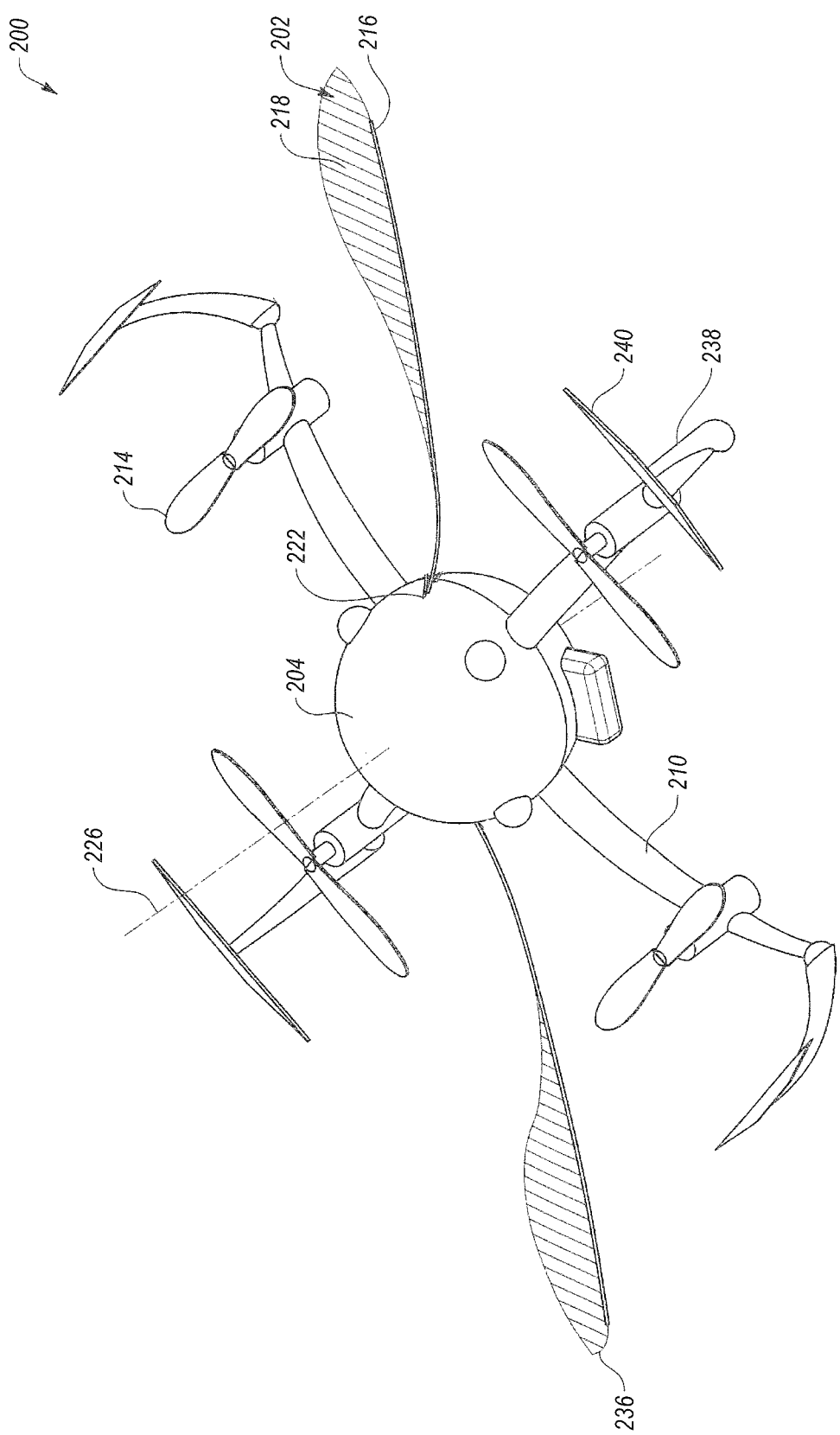
FIG. 4 is a perspective view of the aerial vehicle of FIG. 3 showing deflection of the movable members, according to the present disclosure.
Figures 2, 4:
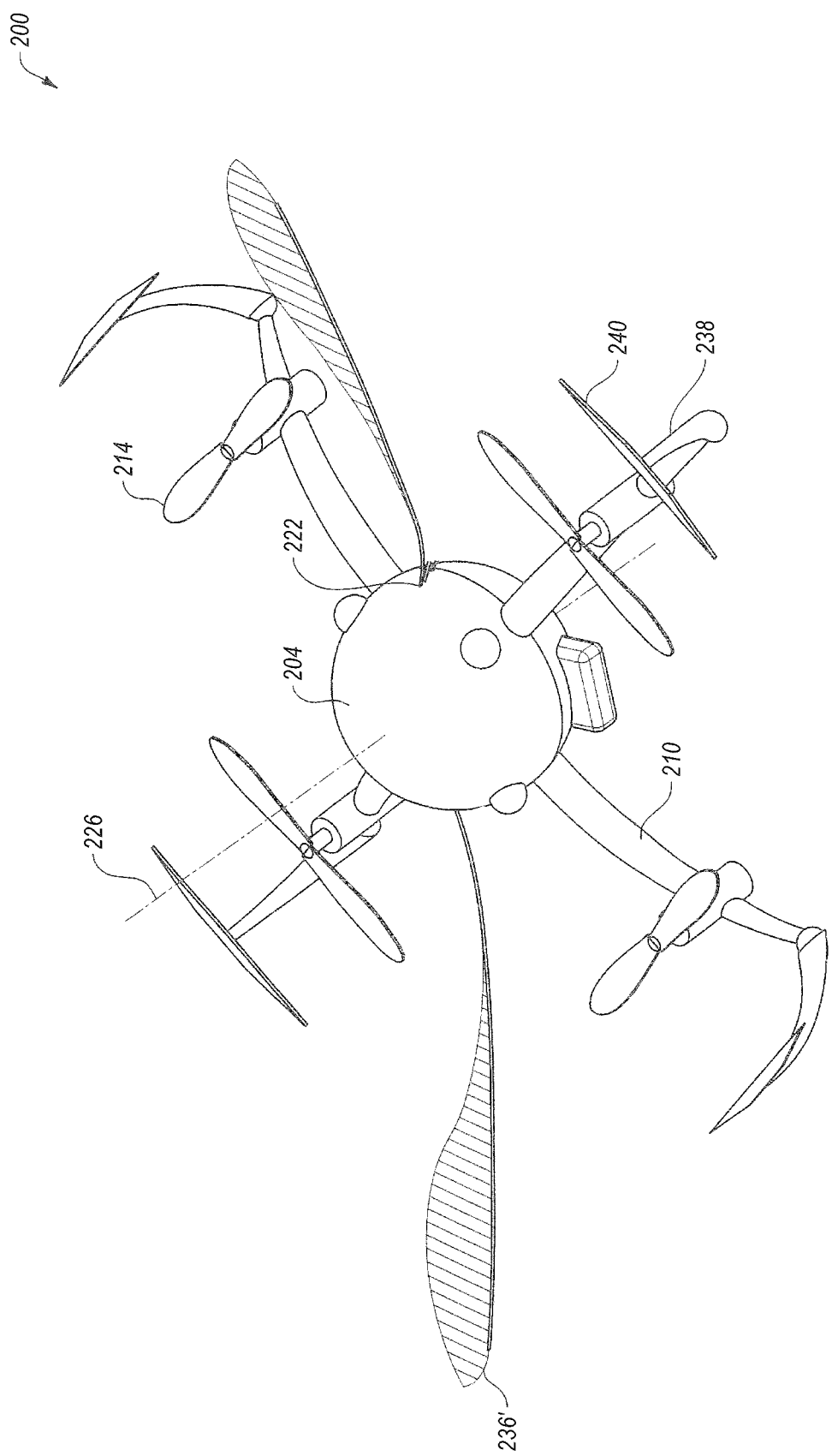
Figures 3, 4:
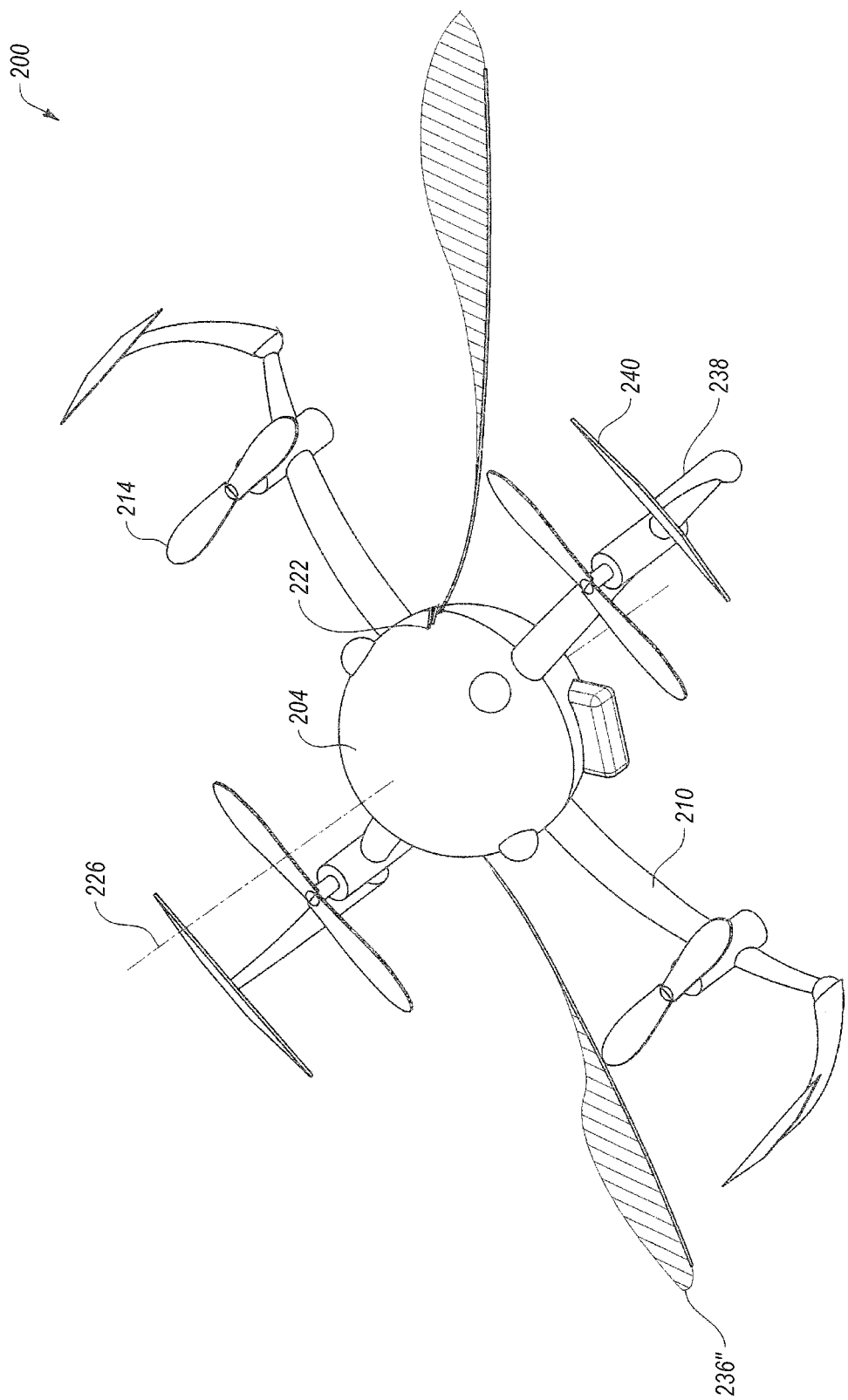

FIG. 3 shows an embodiment of an aerial vehicle 200 with at least one movable member 202 angularly positioned between aerodynamic propulsors 214 relative to a longitudinal axis 226. In the depicted embodiment, the four aerodynamic propulsors 214 are mounted to an undercarriage assembly 210 and angularly distributed at equal 90° intervals about the longitudinal axis 226. In some embodiments, at least one of the plurality of movable members 202 may be angularly positioned substantially centered between two of the four aerodynamic propulsors 214. For example, the movable member 202 may be clocked 45° from the aerodynamic propulsors 214. In other examples, at least one of the plurality of movable members 202 may be clocked at another angle relative to the aerodynamic propulsors 214 (e.g., non-equidistant from the aerodynamic propulsors 214). In yet other examples, at least two of the plurality of movable members 202 may be angularly positioned between aerodynamic propulsors 214 relative to a longitudinal axis 226.

FIG. 4-1, FIG. 4-2, and FIG. 4-3 illustrate the embodiment of an aerial vehicle 200 of FIG. 3 in motion. In some embodiments, a first end 222 of the movable member 202 may be flexibly connected to the body 204 and may support a flapping motion of the movable member 202. In other embodiments, the first end 222 of the movable member 202 may be rigidly connected to the body 204 and the movable member 202 may be flexible. In yet other embodiments, the first end 222 of the movable member 202 may be movably connected to the body 204. The movable member 202 may be cantilevered up and down either by a powered device like an electromagnetic motor and/or by natural resonant behavior of the structure. For example, the movable member 202 may be movably connected to the body 204 by an electric motor that oscillates the movable member 202 through a range of motion. In another example, the movable member 202 may oscillate a distance in a direction perpendicular to the flow of air relative to the aerial vehicle 200. The flow of air relative to the aerial vehicle 200 may be at least partially due to the acceleration of air through the aerodynamic propulsors 214. In other embodiments, the flow of air relative to the aerial vehicle 200 may be due to other factors, such as wind, lateral flight of the aerial vehicle, or other relative movement of the aerial vehicle 200 to the atmosphere.

The movement of the movable members 202 may be at least partially due to the flow of air past the flexible member 216 and associated sheet 218 attached thereto. The sheet 218 may have a thickness related to the size of the aerial vehicle 200 and the conditions in which the aerial vehicle 200 may be operated. In some embodiments, the sheet 218 may have a thickness in a range having upper and lower values including any of 20 microns, 50 microns, 100 microns, 1.0 millimeter, 1.5 millimeters, 2.0 millimeters, 3.0 millimeters, or any value therebetween. For example, the sheet 218 may have a thickness in a range of 20 microns to 3.0 millimeters. In another example, the sheet 218 may have a thickness in a range of 50 microns to 1.5 millimeters. In yet another example, the sheet 218 may have a thickness of 100 microns.

The movable member 202 may have a range of motion from an initial position 236 (without movement and/or flow of air) to a first position 236' and a second position 236" (with movement and/or flow of air). In some embodiments, a first deflection in a first direction from the initial position 236 (e.g., FIG. 4-1) to the first position 236' (e.g., FIG. 4-2) and a second deflection in a second direction from the initial position 236 to the second position 236" (e.g., FIG. 4-3) may be substantially equal. In other embodiments, the first deflection may be greater than the second deflection. In yet other embodiments, the second deflection may be greater than the first deflection. In some embodiments, the deflection may be within a plane that includes the longitudinal axis 226. In other embodiments, the deflection may be within a plane that forms a non-zero angle with the longitudinal axis 226.

In some embodiments, the aerial vehicle 200 may include extensions 238 of the undercarriage assembly 210. The extension 238 may include propulsor guards 240 that extend therefrom to protect both the aerodynamic propulsor 214 (e.g. rotor) from damage upon contact with foreign objects and the foreign objects from harm due to contact with the aerodynamic propulsor 214.

Figure 5:
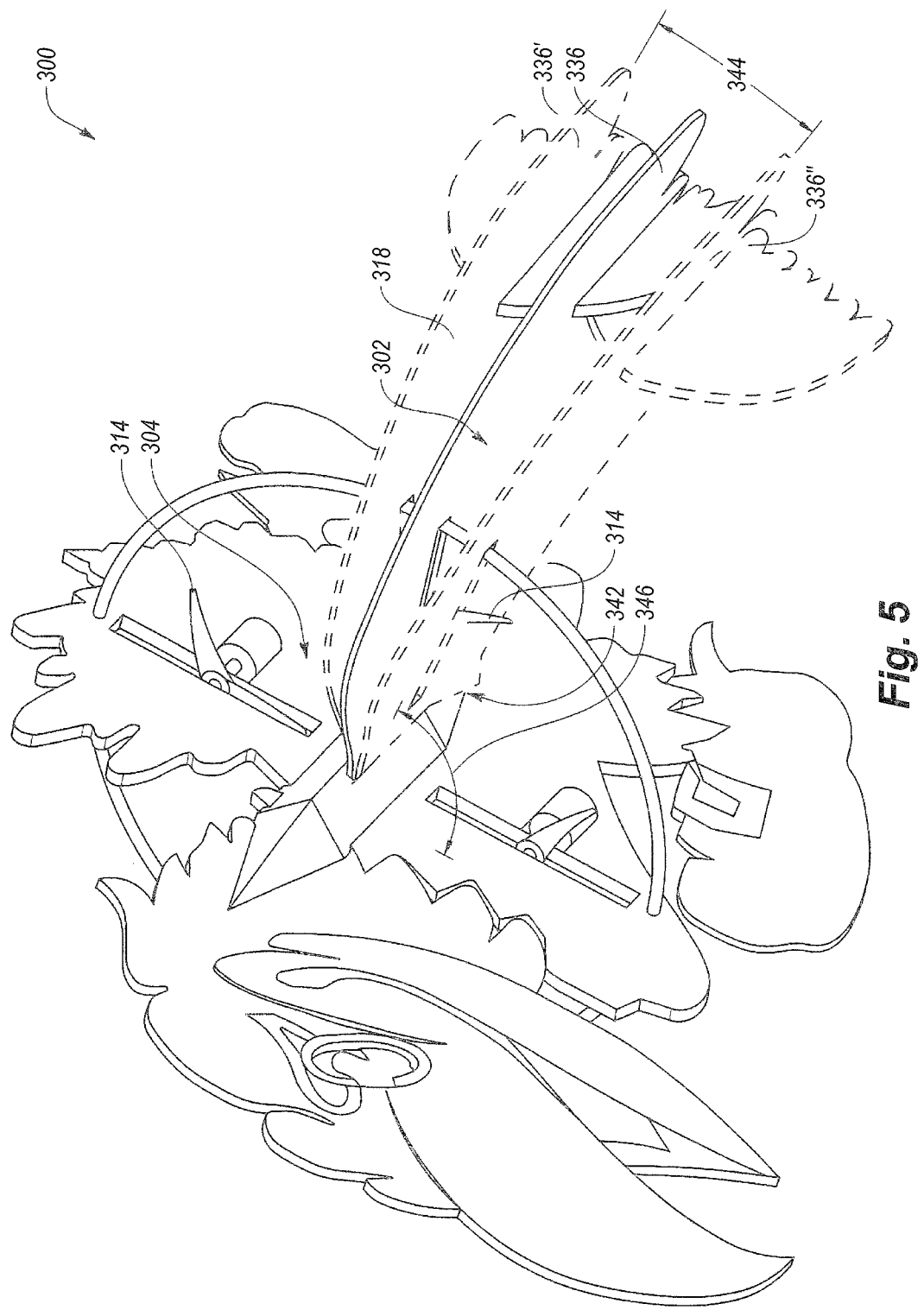
FIG. 5 is a perspective view of an embodiment of an aerial vehicle having a body configured to replicate another object and having aerodynamic propulsors supported by movable members, according to the present disclosure.

In some embodiments, the body may be configured to replicate other objects and/or to allow the aerial vehicle to conceal one or more components of the aerial vehicle. For example, FIG. 5 shows an embodiment of an aerial vehicle 300 with a body 304 configured to replicate a stylized bird. The movable members 302 of the aerial vehicle 300 are the wings of the stylized bird. The movable members 302 may deflect from an initial position 336 relative to the body 304. As described herein, the movable members 302 may move to first position 336' in a first direction and a second position 336" in a second, opposite direction. In some embodiments, the total deflection 344 between the first position 336' and the lower position 336" may be in a range having upper and lower values including any of 10°, 20°, 30°, 40°, 50°, 60°, 70°, 80°, 90°, or any value therebetween. For example, the total deflection between the first position 336' and the second position 336" may be in a range of 10° to 90°. In another example, the total deflection between the first position 336' and the second position 336" may be in a range of 20° to 80°. In yet another example, the total deflection between the first position 336' and the second position 336" may be in a range of 30° to 70°.

In the case of a body 304 having a body 304 that is at least partially flat, the movable members 302 may be mounted to the body 304 by a hinged connection 342. The movable members 302 may be oriented at an angle 346 to the body 304. The angle 346 may vary as the movable member 302 deflects from the initial position 336. The angle 346 may be in a range having upper and lower values including any of 45°, 50°, 60°, 70°, 80°, 90°, 100°, 110°, 120°, 130°, 135°, or any value therebetween. For example, the angle 346 may be in a range of 45° to 135°. In another example, the angle 346 may be in a range of 60° to 120°. In yet another example, the angle 346 may be in a range of 70° to 110°.

In some embodiments, at least one of the aerodynamic propulsors 314 may be supported by a movable member 302. For example, at least one aerodynamic propulsor 314 may be mounted the movable member 302 and may move relative to the body 304 as the movable member 302 moves from the initial position 336 through the deflection 344. In such embodiments, the aerodynamic propulsor 314 may be mounted within the sheet 318 of the movable member 302. In other embodiments, the aerodynamic propulsor 314 may be stationary relative to the body 304 and/or the movable member 302 may include an aperture or other opening through the sheet 318 that allows at least a part of the aerodynamic propulsor 314 to project therethrough during operation and movement of the movable member 302.

Figure 6:
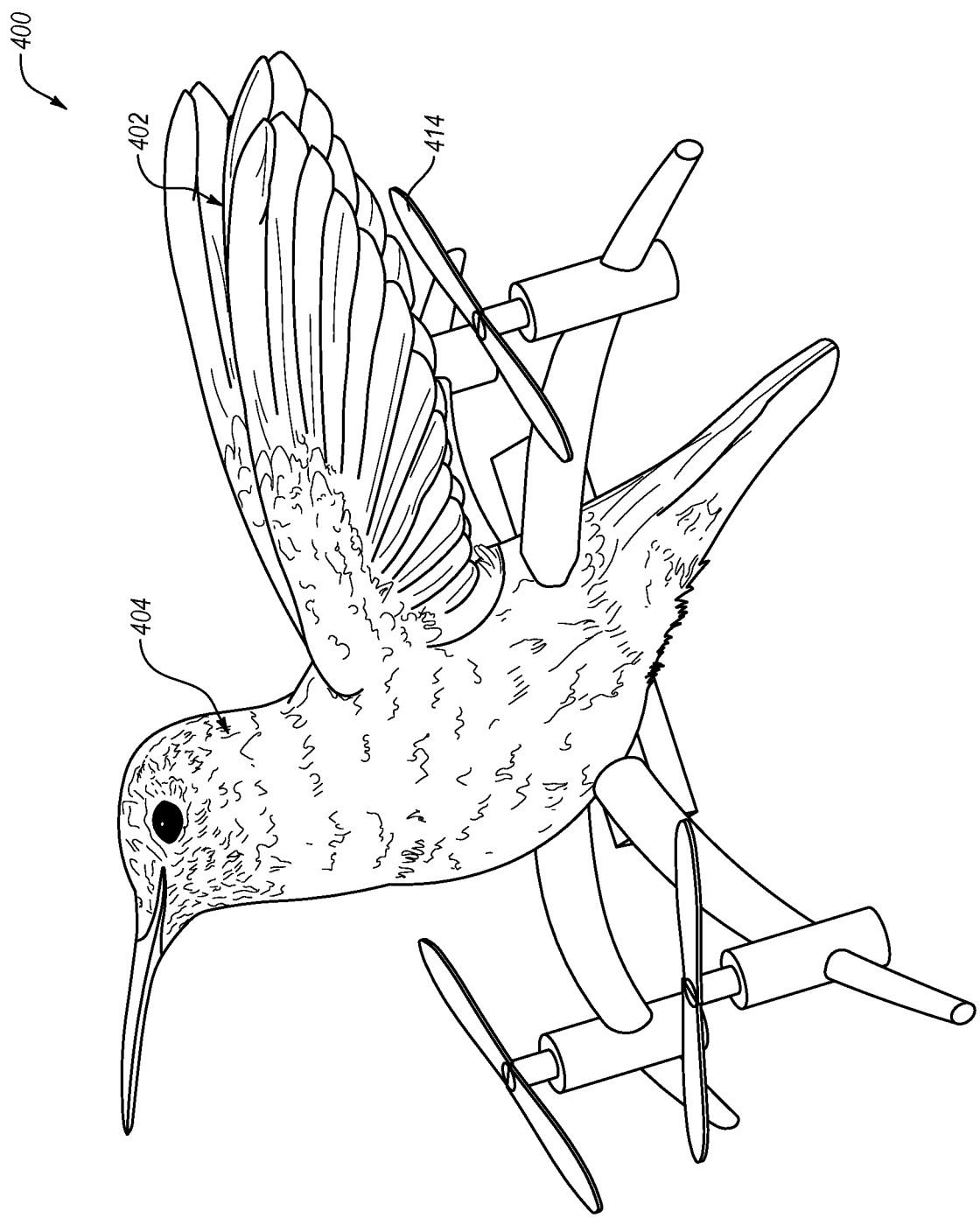
FIG. 6 is a perspective view of an embodiment of an aerial vehicle having a body configured to resemble a bird, according to the present disclosure.
Figure 7A:
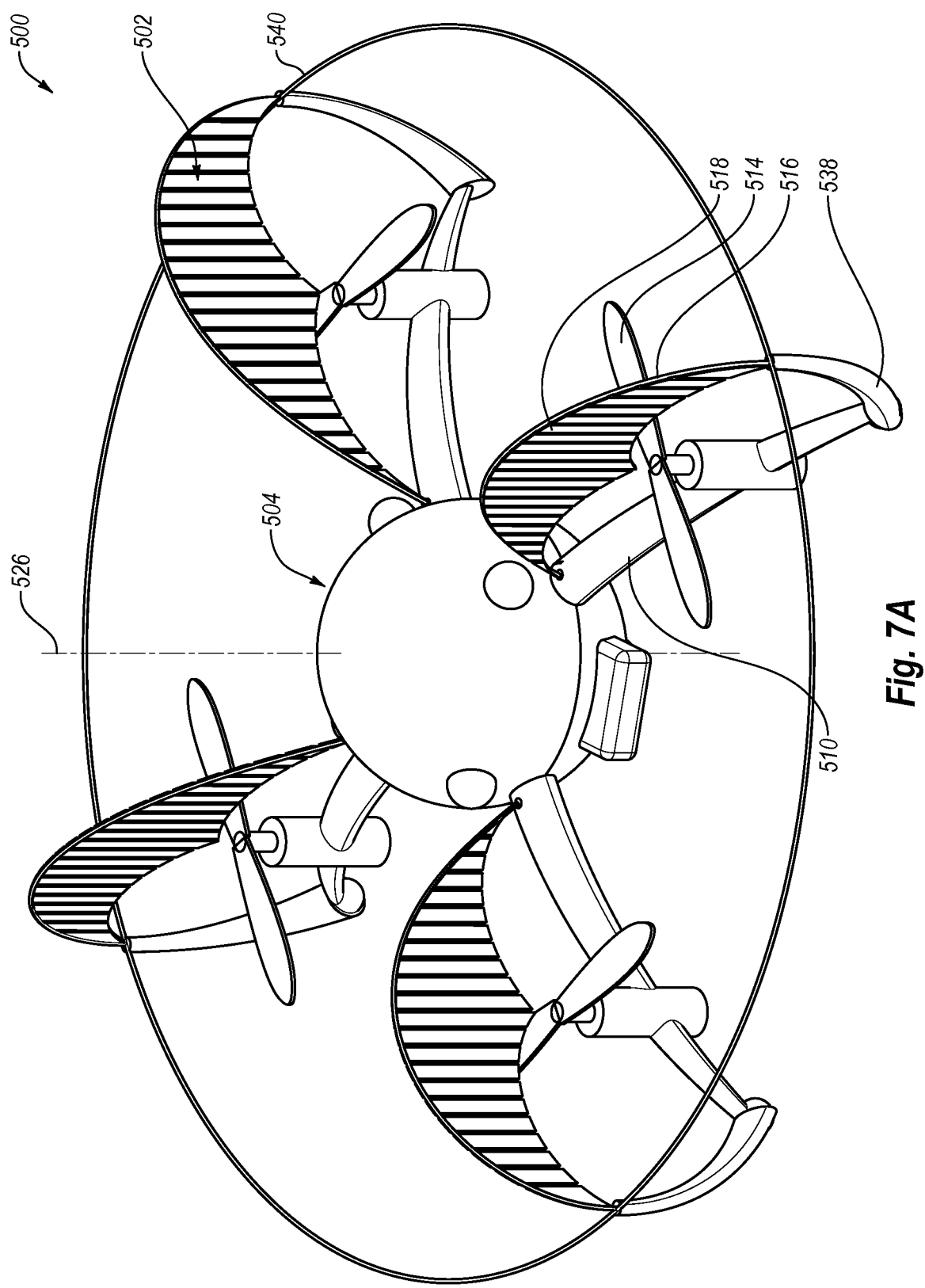
FIG. 7A is a perspective view of an embodiment of an aerial vehicle having arched flexible members configured to protect an aerodynamic propulsor, according to the present disclosure.
Figure 7F:
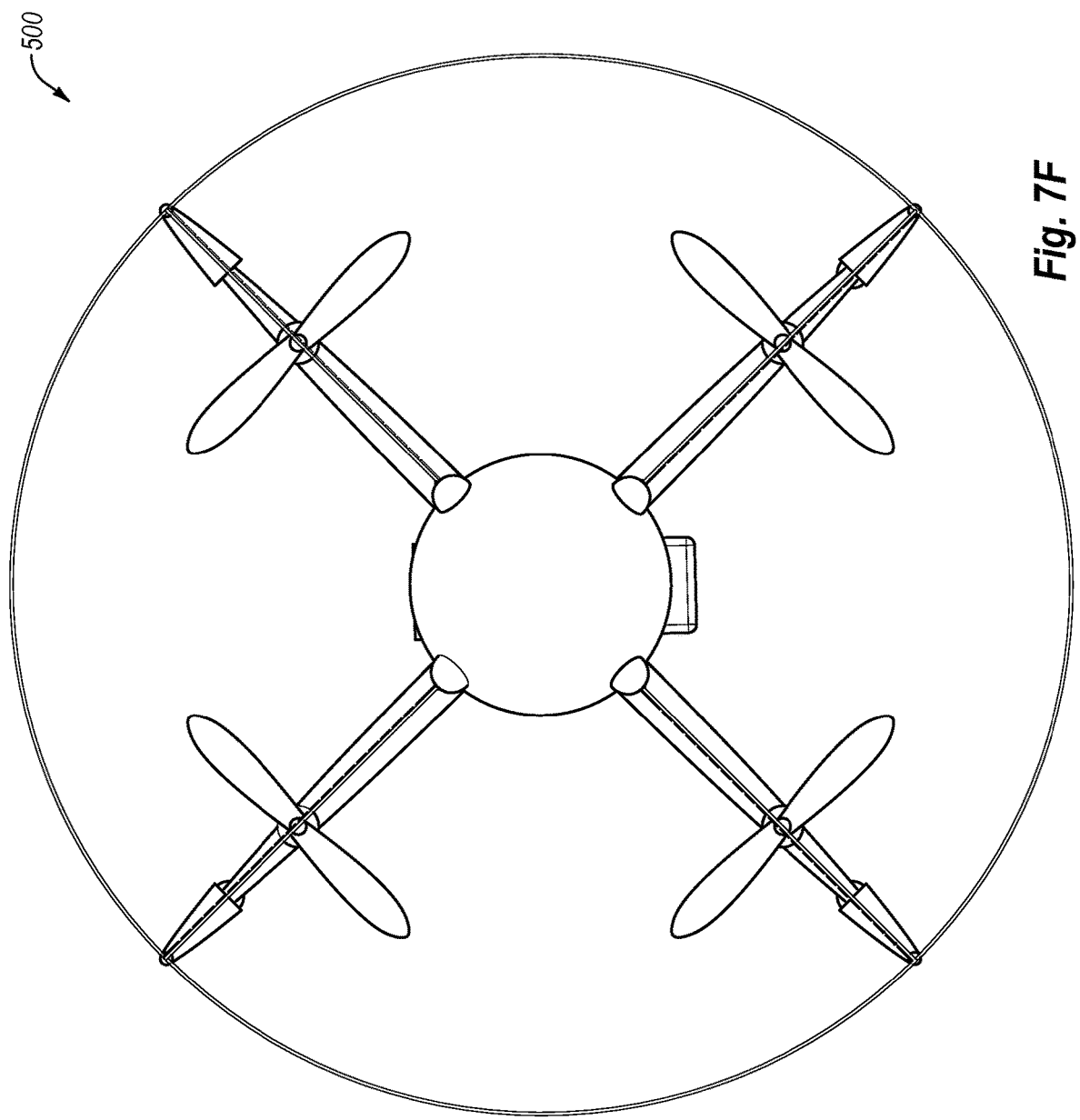
FIG. 7F is a top view of the aerial vehicle of FIG. 7A.
Figure 7G:
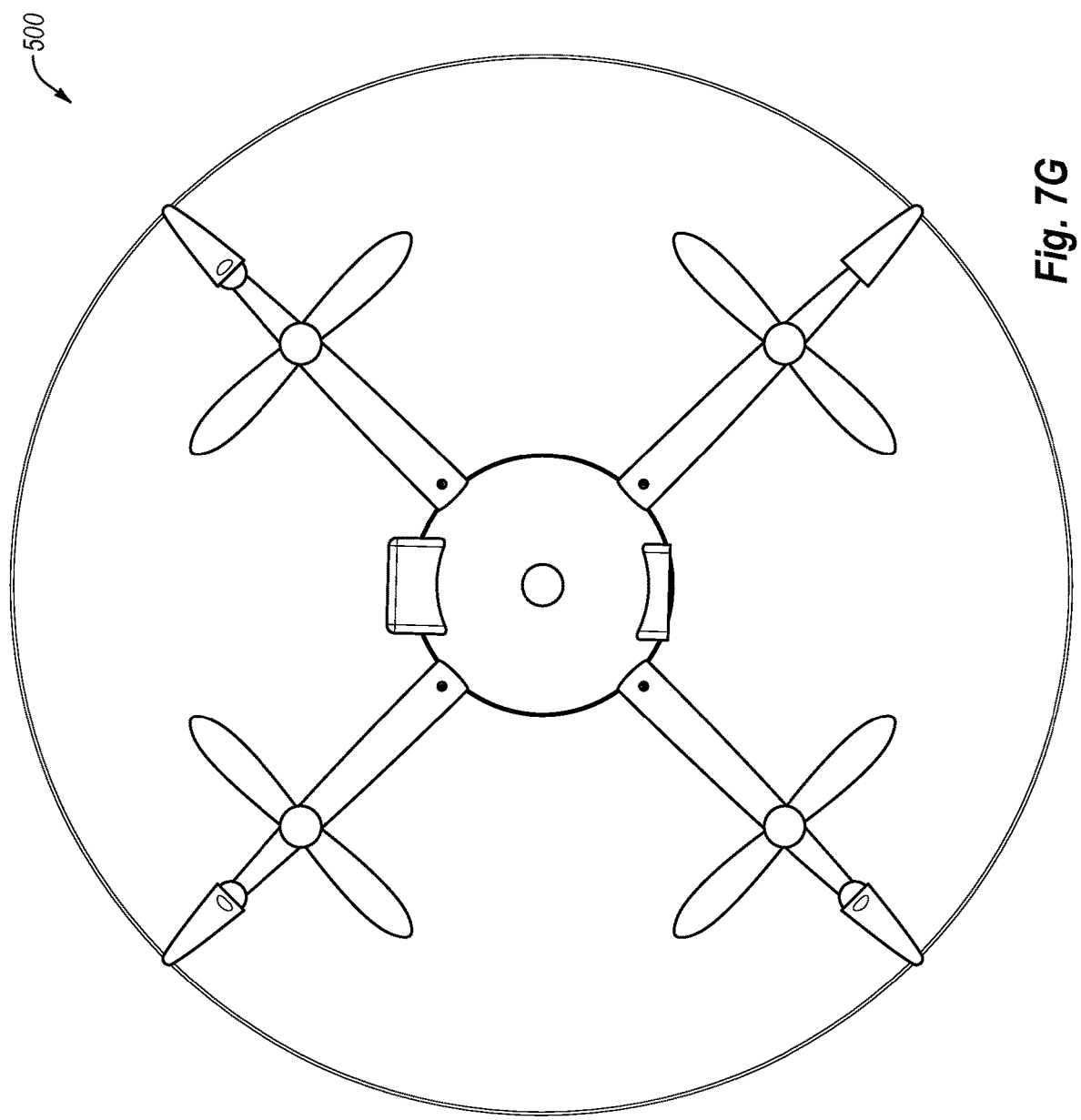
FIG. 7G is a bottom view of the aerial vehicle of FIG. 7A.
Figure 8A:
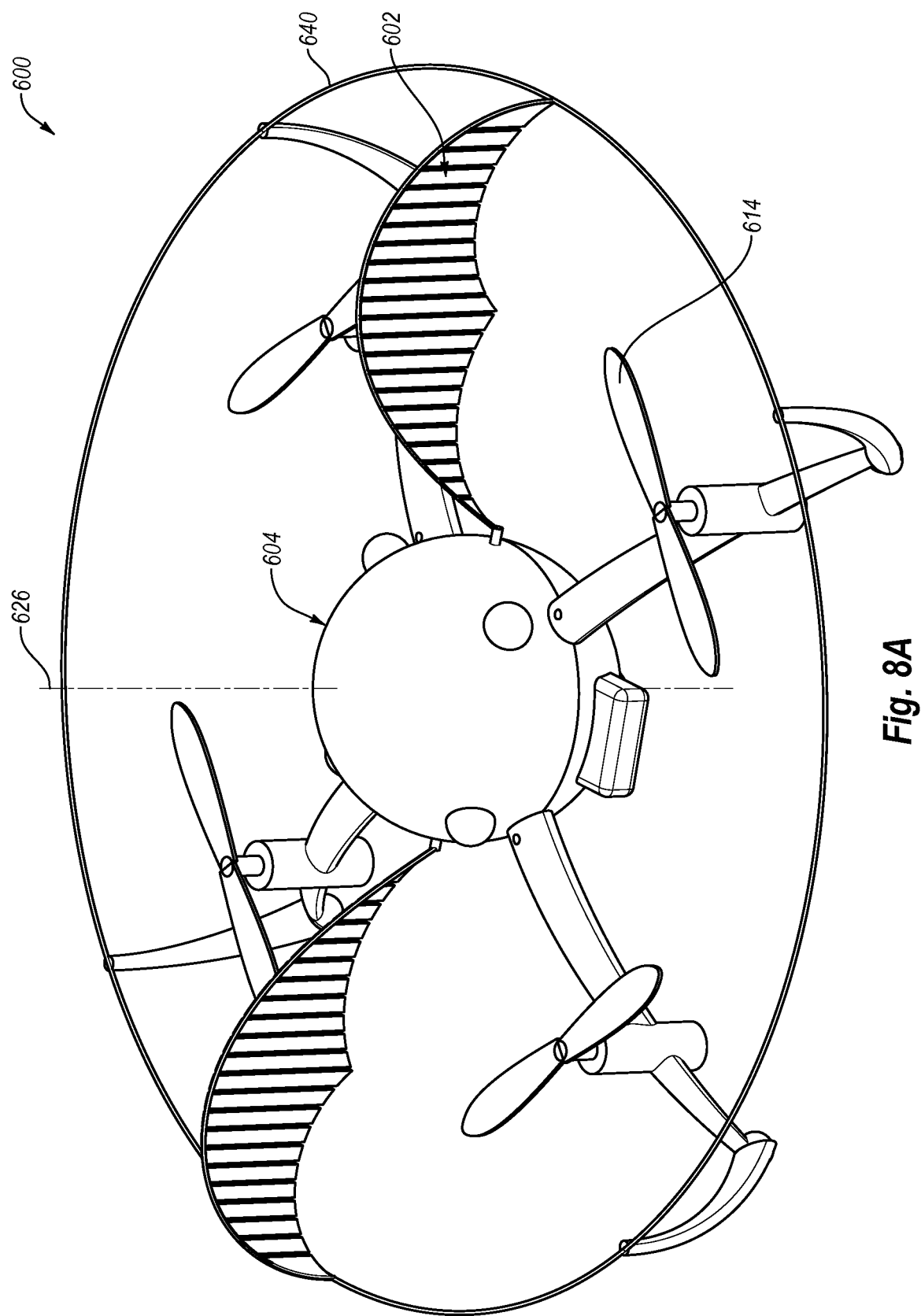
FIG. 8A is a perspective view of an embodiment of an aerial vehicle having arched flexible members configured to protect an aerodynamic propulsor positioned angularly between the aerodynamic propulsors, according to the present disclosure.
Figure 8B:
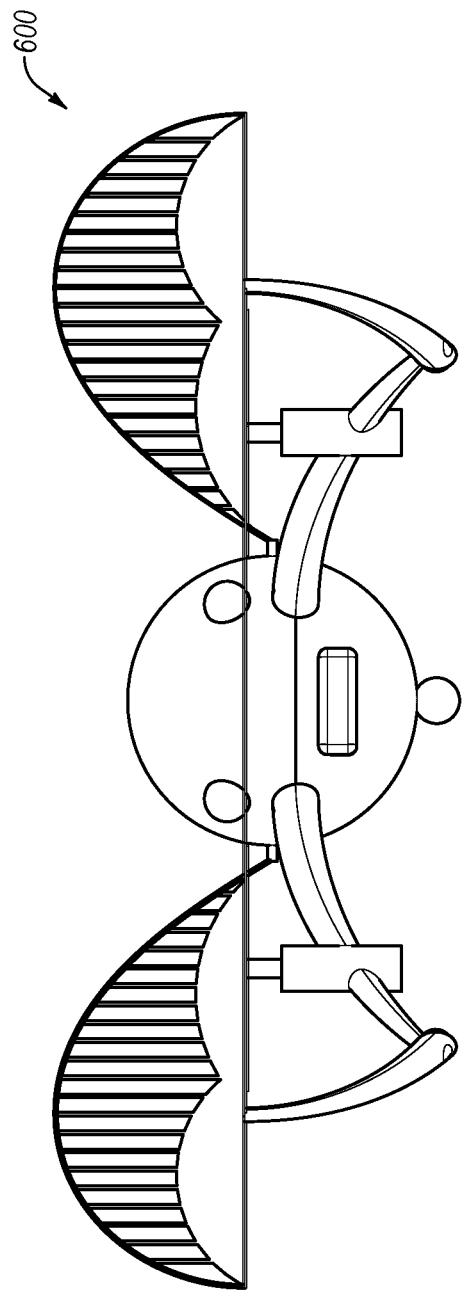
FIG. 8B is a front view of the aerial vehicle of FIG. 8A.
Figure 8C:
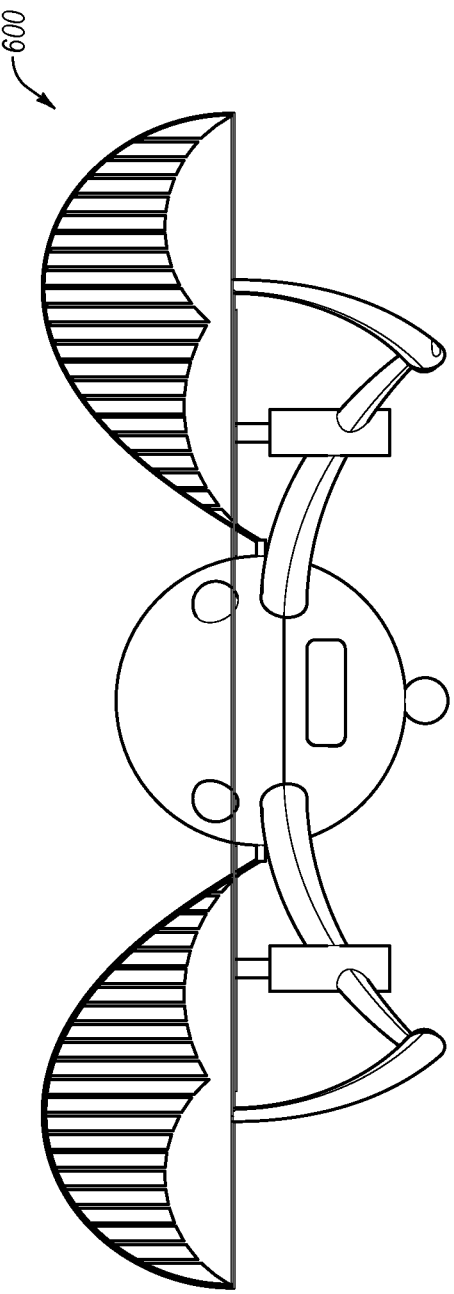
FIG. 8C is a back view of the aerial vehicle of FIG. 8A.
Figure 8D:
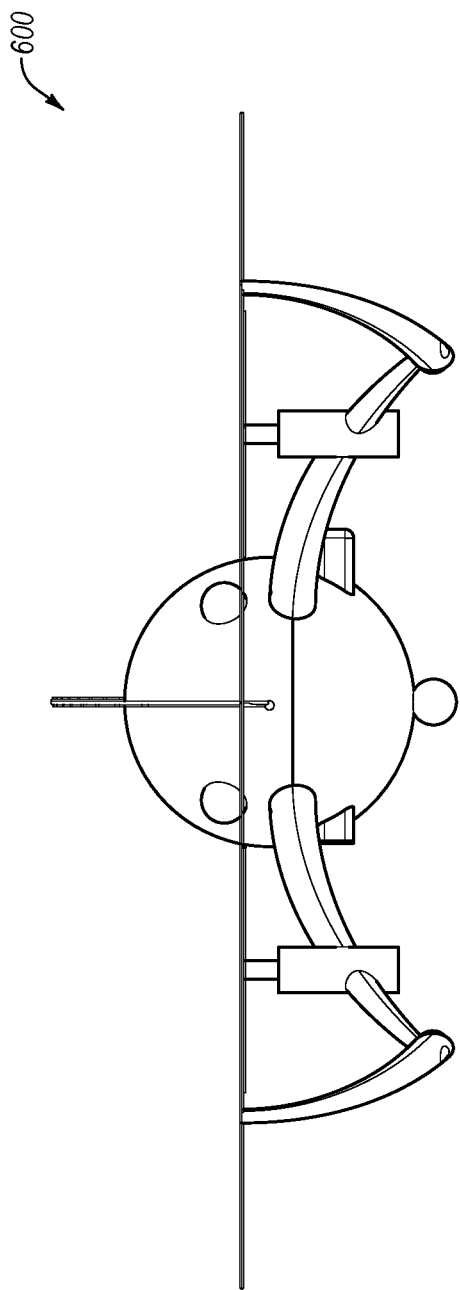
FIG. 8D is a left view of the aerial vehicle of FIG. 8A.
Figure 8E:
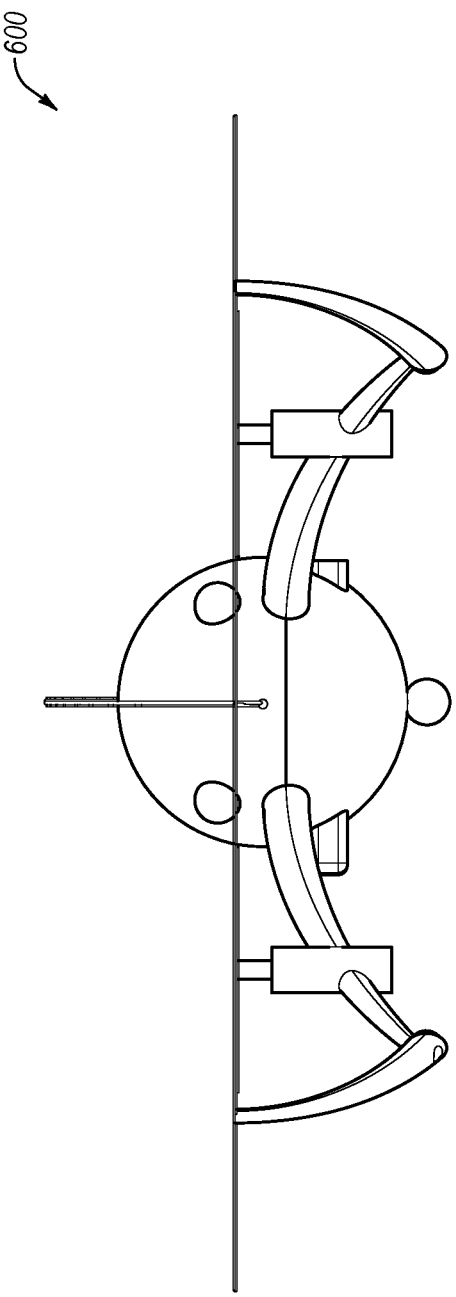
FIG. 8E is a right view of the aerial vehicle of FIG. 8A.
Figure 8F:
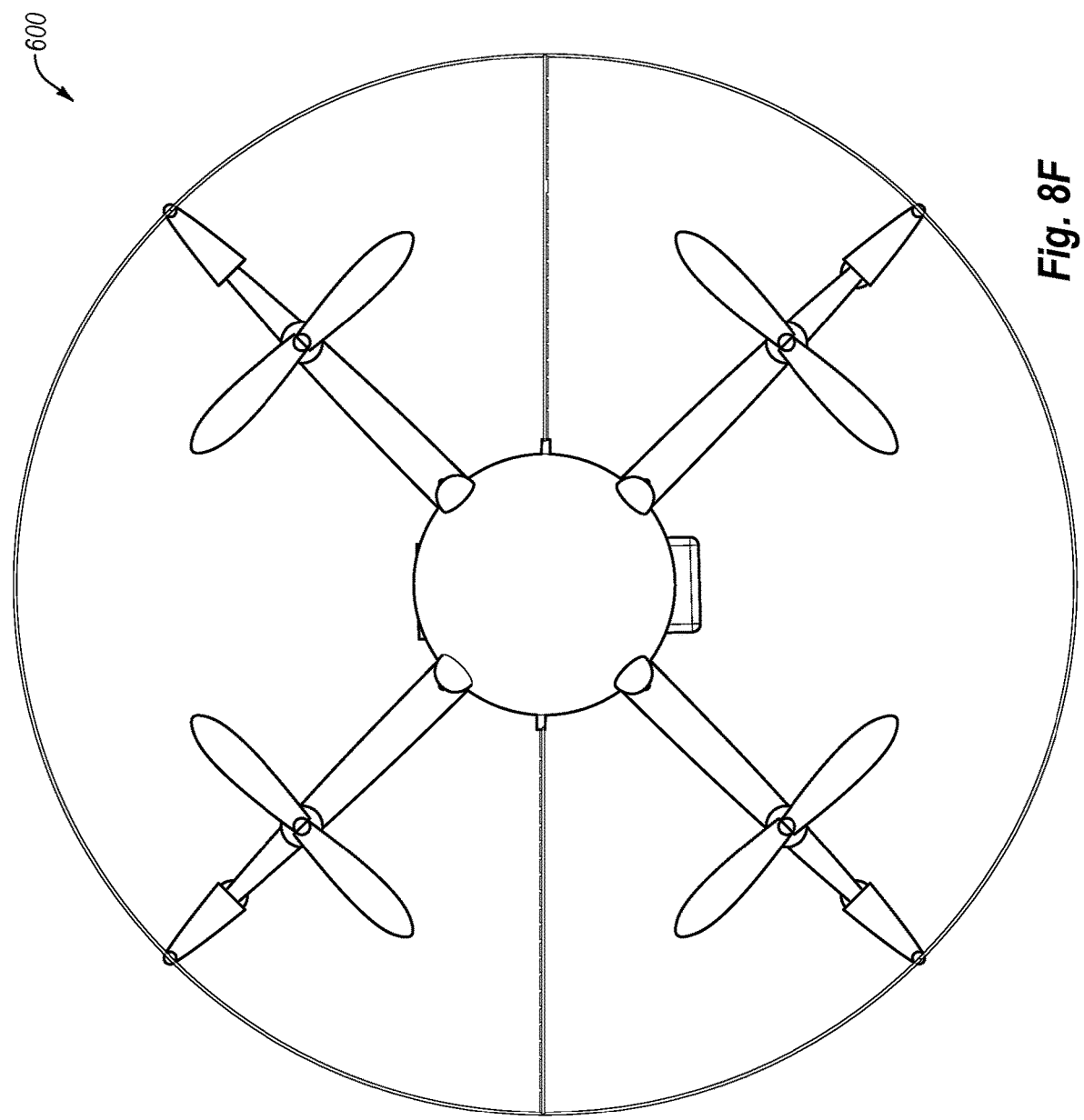
FIG. 8F is a top view of the aerial vehicle of FIG. 8A.
Figure 8G:
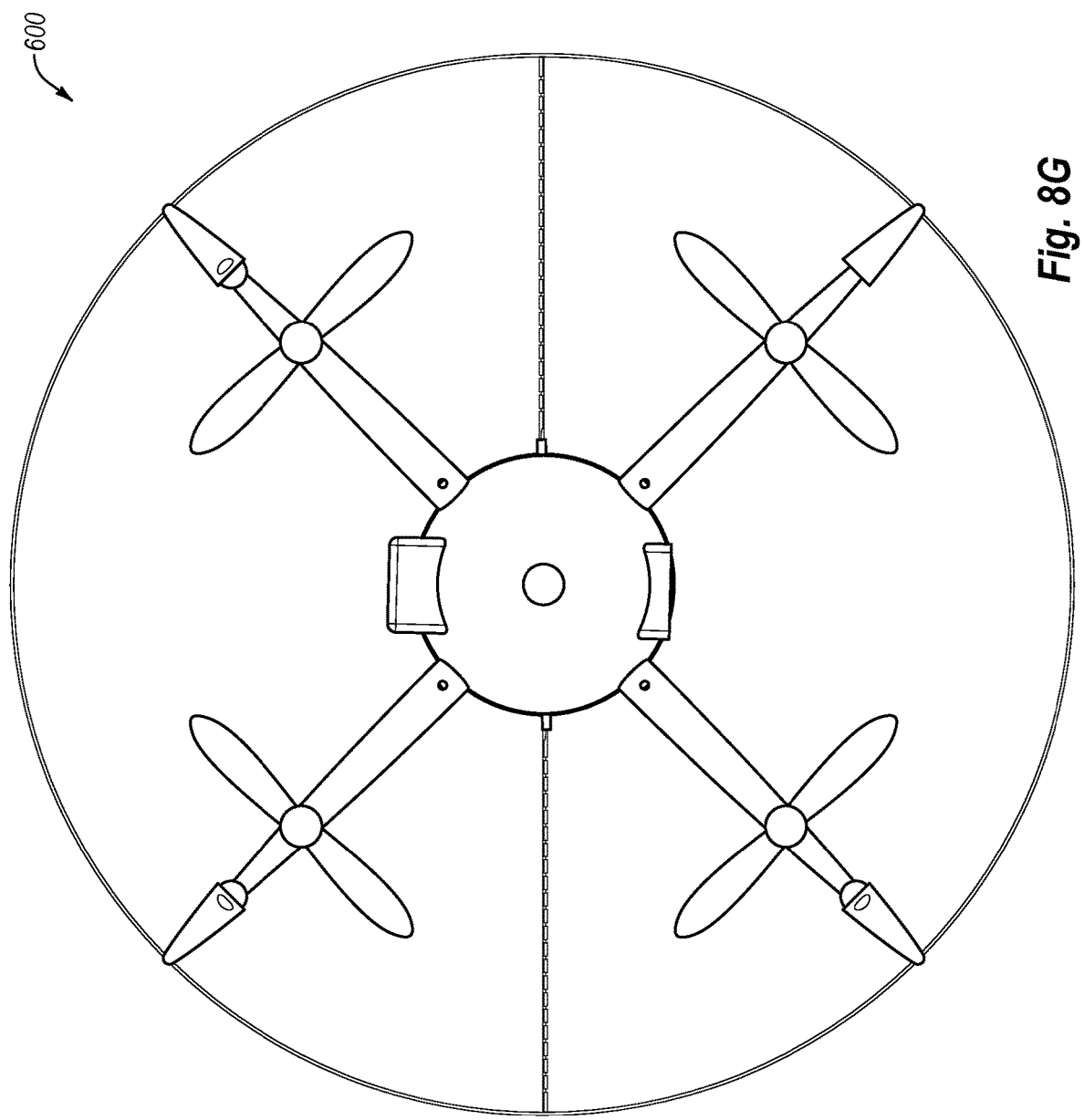
FIG. 8G is a bottom view of the aerial vehicle of FIG. 8A.

FIG. 6 illustrates an embodiment of an aerial vehicle 400 that is configured to replicate a natural object, such as a bird. The aerial vehicle 400 may have a plurality of aerodynamic propulsors 314 supported about a body 404 and movable members 402 that are configured to replicate the body and wings of a bird. In some embodiments, the plurality of movable members 402 may not be equally distributed angularly relative to the aerodynamic propulsors 414. For example, each movable member 402 may be aligned with, or between one or more of the aerodynamic propulsors 414, similar to the embodiments described in relation to FIG. 2. Each movable member 402 may lack an opposing movable member 402 on an opposing side of the body 404.

FIG. 7A through 7G depict another embodiment of an aerial vehicle 500, where the aerial vehicle 500 includes a propulsor guard 540 that extends around the aerial vehicle 500 and connects at least two points on an undercarriage assembly 510. The propulsor guard 540, similar to the propulsor guard 240 described in relation to FIG. 2, may limit or prevent contact between foreign objects and at least a part of one or more of the aerodynamic propulsors 514.

The propulsor guard 540 may, in some embodiments, extend around the entire perimeter of the aerial vehicle 500. For example, the propulsor guard 540 may provide structural support to the undercarriage assembly 510. In another example, the undercarriage assembly 510 may provide structural support to the propulsor guard 540.

In some embodiments, the aerial vehicle 500 may have at least one movable member 502 that extends from the body 504 to an extension 538 of the undercarriage assembly 510. The movable member 502 may include a flexible member 516 that forms an arched structure projecting away from the undercarriage assembly 510 and/or an aerodynamic propulsor 514. A sheet 518, as described herein, may be connected to the flexible member 516 along at least a part of the flexible member 516 and/or the sheet 518. The sheet 518 may be unconnected to the flexible member 516 and/or undercarriage assembly 510 (i.e. free to move relative to the flexible member 516 and/or undercarriage assembly 510).

The flexible member 516 extending in an arch from the body 504 to the undercarriage assembly 510 may provide a flexible guard in a different direction from the propulsor guard 540 extending about the aerial vehicle 500. In some embodiments, the flexible member 516 of the movable member 502 may project in a direction parallel to a longitudinal axis 526 of the aerial vehicle 500, and the propulsor guard 540 may extend circumferentially about the aerial vehicle 500 in a direction transverse to the longitudinal axis 526. The sheet 518 may extend from the flexible member 516 and may move and/or deflect during operation of the aerial vehicle 500 to provide the visual impression that the movable member 502 is moving when the flexible member 516 stays relatively stationary and provides protection to the aerodynamic propulsor 514.

FIG. 7B through FIG. 7G are a front view, a back view, a left view, a right view, a top view, and a bottom view, respectively, of the aerial vehicle 500.

FIG. 8A through FIG. 8G illustrate another embodiment of an aerial vehicle 600 having arched flexible members 616 and a propulsor guard 640. The arched flexible members 616 of a plurality of movable members 602 may extend from the body 604 to the propulsor guard 640. In some embodiments, the propulsor guard 640 may extend circumferentially about the aerial vehicle 600. Connecting the arched flexible member 616 to the propulsor guard 640 may allow the arched flexible members 616 to be oriented at any position about a longitudinal axis 626 of the aerial vehicle 600. For example, at least one arched flexible member 616 may be angularly positioned between two aerodynamic propulsors 614. Angularly positioning an arched flexible member 616 between two aerodynamic propulsors 614 may allow unobstructed air flow to and/or through the aerodynamic propulsor 614 and may improve thrust and/or handling of the aerial vehicle 600. Angularly positioning an arched flexible member 616 between two aerodynamic propulsors 614 may allow unobstructed air flow to and/or through the aerodynamic propulsor 614 and may improve thrust and/or handling of the aerial vehicle 600.

Multiple redundant arch structures may be structurally stable and self-reinforcing. Arch assemblies may be formed from structural flexible members, which are connected by thin webs or sheets as in fish tails and the feet of many aquatic avians. These structures may have the ability to flex under load and yet still maintain their structural integrity and tailored stiffness.

Another use for the arched flexible members 616 and/or propulsor guard 640 (and/or any other arched flexible members and/or propulsor guards described herein) is that of magnetometer assembly and/or the formation of loop antennae and capacitance detecting for ground proximity sensing. Additionally, the arched flexible members 616 and/or propulsor guard 640 may be used as loop antennae for determination of orientation with respect to the controller. The arched flexible members 616 and/or propulsor guard 640 may also be used as magnetic flux detectors so as to act as the elements of a magnetometer for precise directional control. The arched flexible members 616 and/or propulsor guard 640 may experience a change in capacitance in the proximity of the ground and when in contact with either an object or the ground. Further aiding the safety aspects of the aerial vehicle 600 may be providing electrical communication with the arched flexible members 616 and/or propulsor guard 640 when it comes into contact with a material of prescribed capacitance or resistance, such as human or animal flesh, to stop the aerodynamic propulsors 614, limiting resultant injuries. This can be sensed by integrating comparator circuitry arched in electrical communication with the flexible members 616 and/or propulsor guard 640. The flexible members 616 and/or propulsor guard 640 may also be used as lobe antennae should information such as video or flight state signals be desired to be telemetered to the ground.

FIG. 8B through FIG. 8G are a front view, a back view, a left view, a right view, a top view, and a bottom view, respectively, of the aerial vehicle 600.

Figure 9:
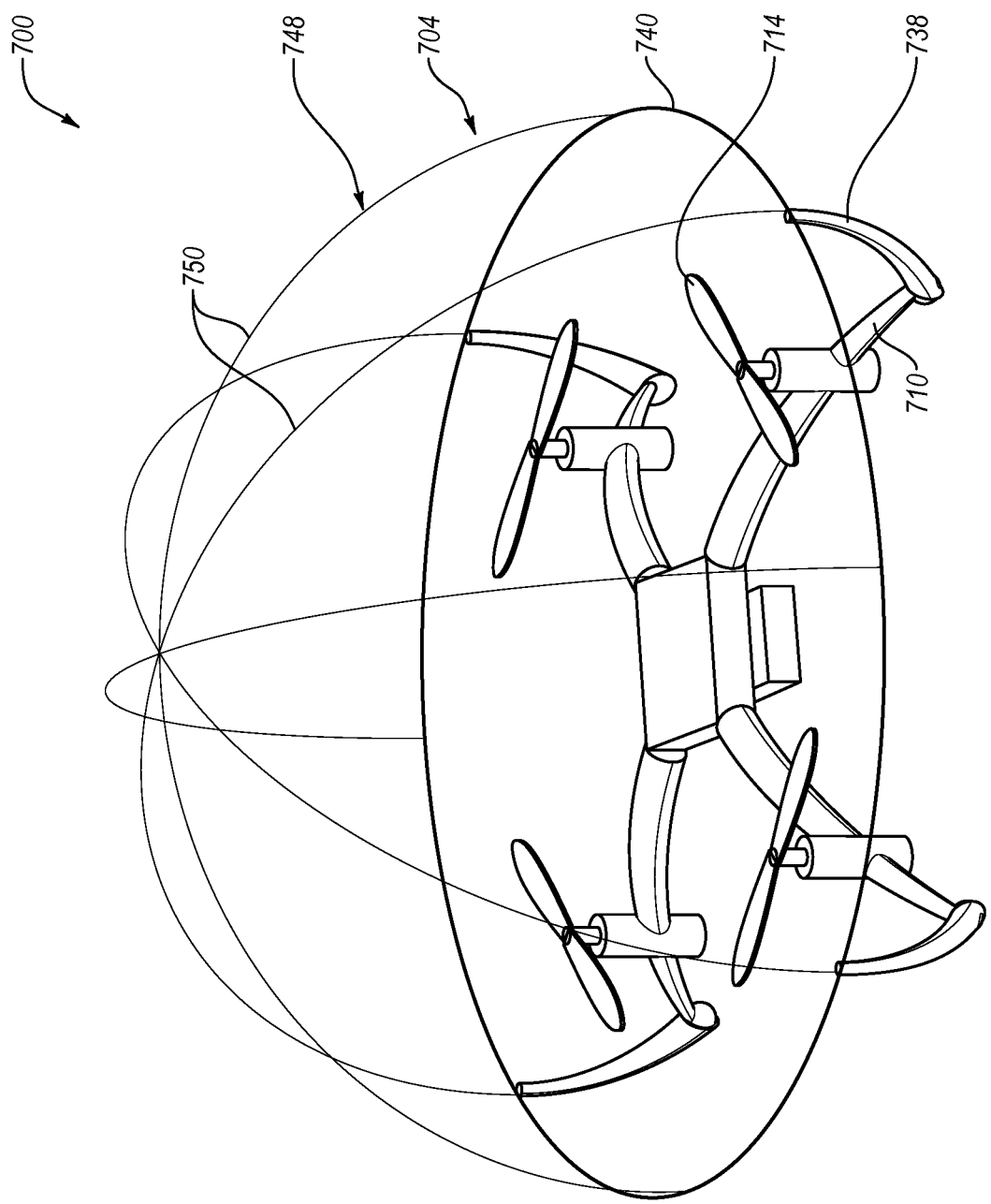
FIG. 9 is a perspective view of an embodiment of an aerial vehicle having a domed support member, according to the present disclosure.
Figure 10A:
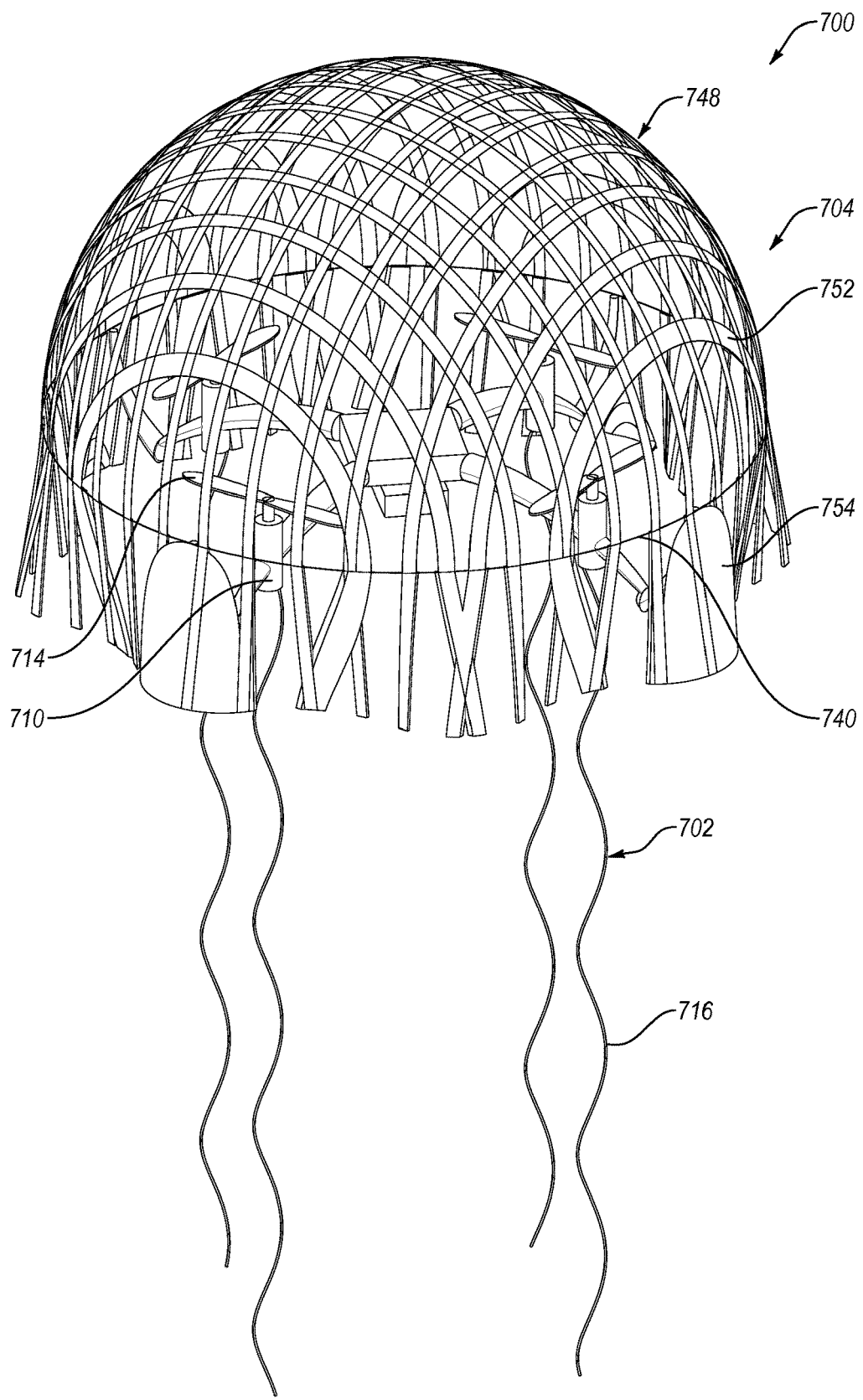
FIG. 10A is a perspective view of the aerial vehicle of FIG. 9 having a flexible cover upon the domed support member and a plurality of movable members affixed to an undercarriage assembly, according to the present disclosure.
Figure 10B:
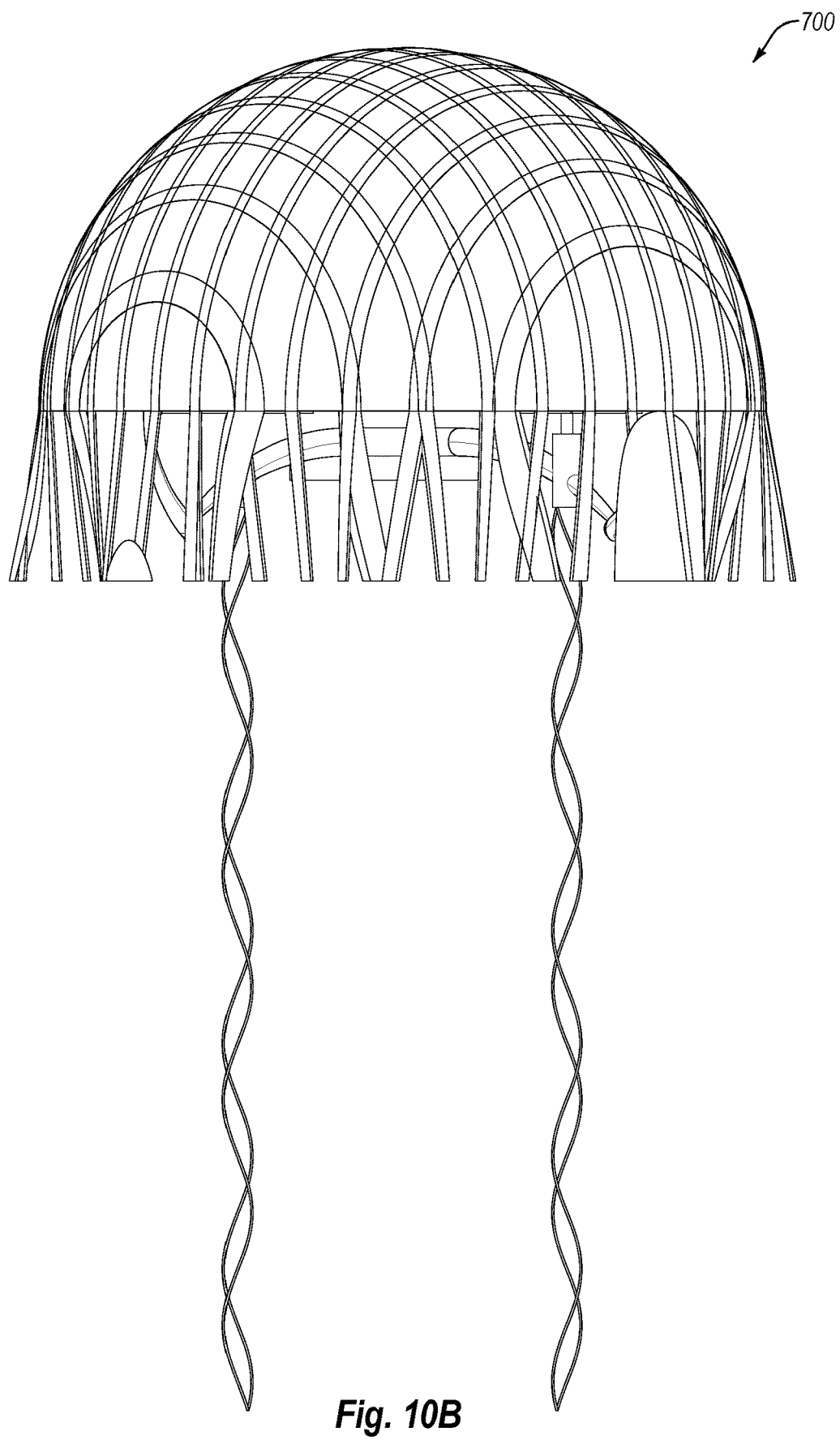
FIG. 10B is a front view of the aerial vehicle of FIG. 10A.
Figure 10C:
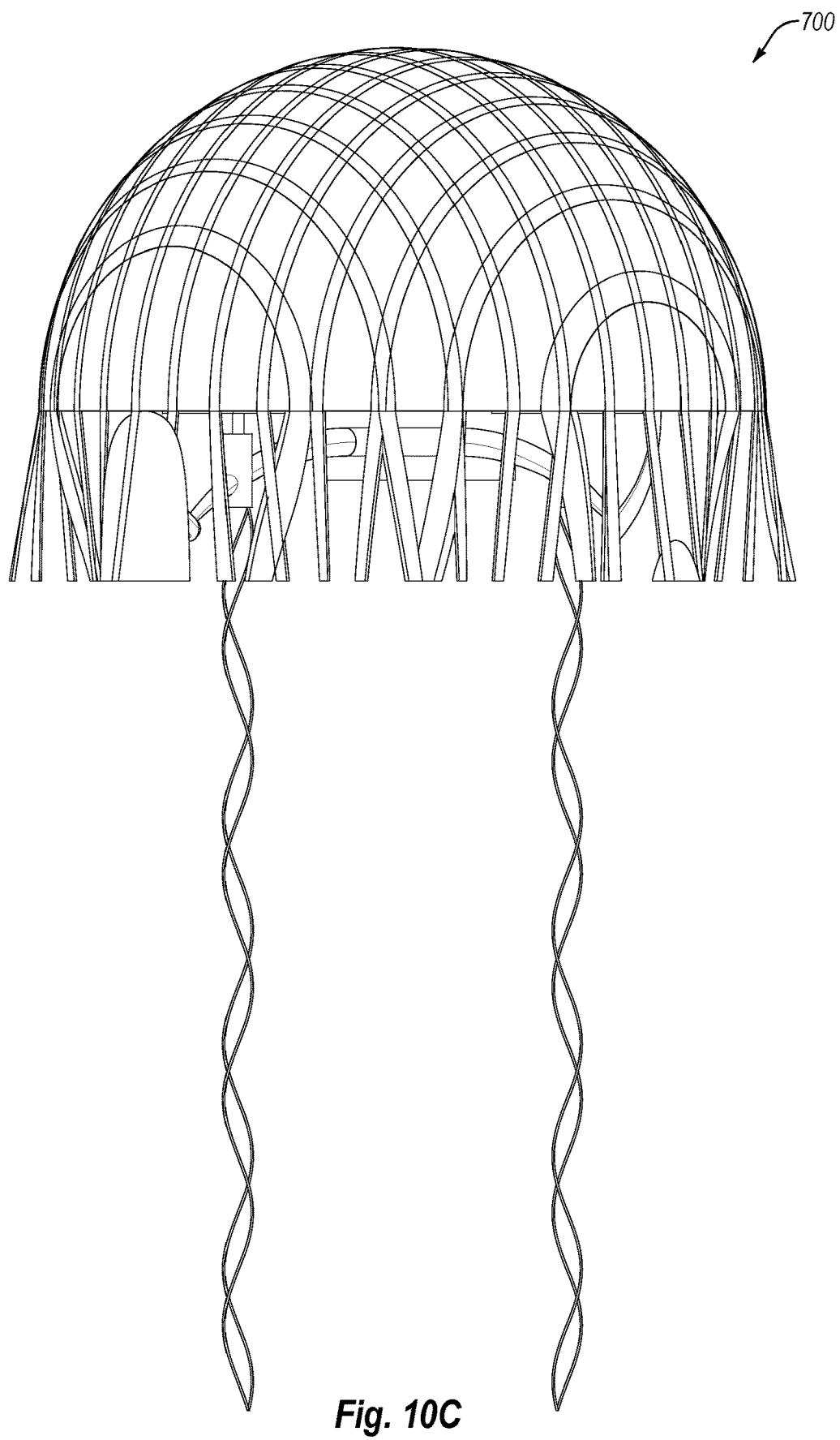
FIG. 10C is a back view of the aerial vehicle of FIG. 10A.
Figure 10D:
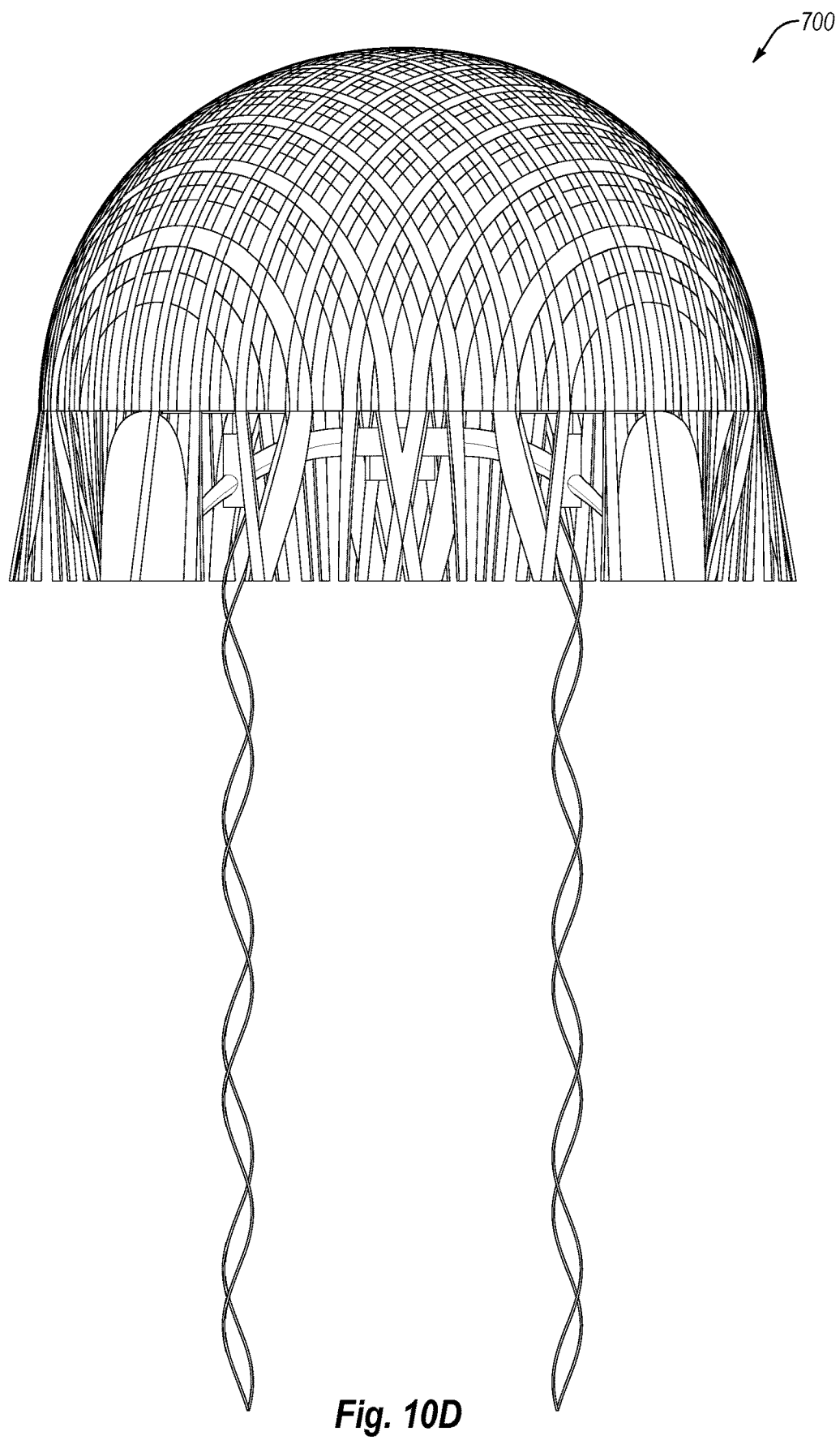
FIG. 10D is a left view of the aerial vehicle of FIG. 10A.
Figure 10E:
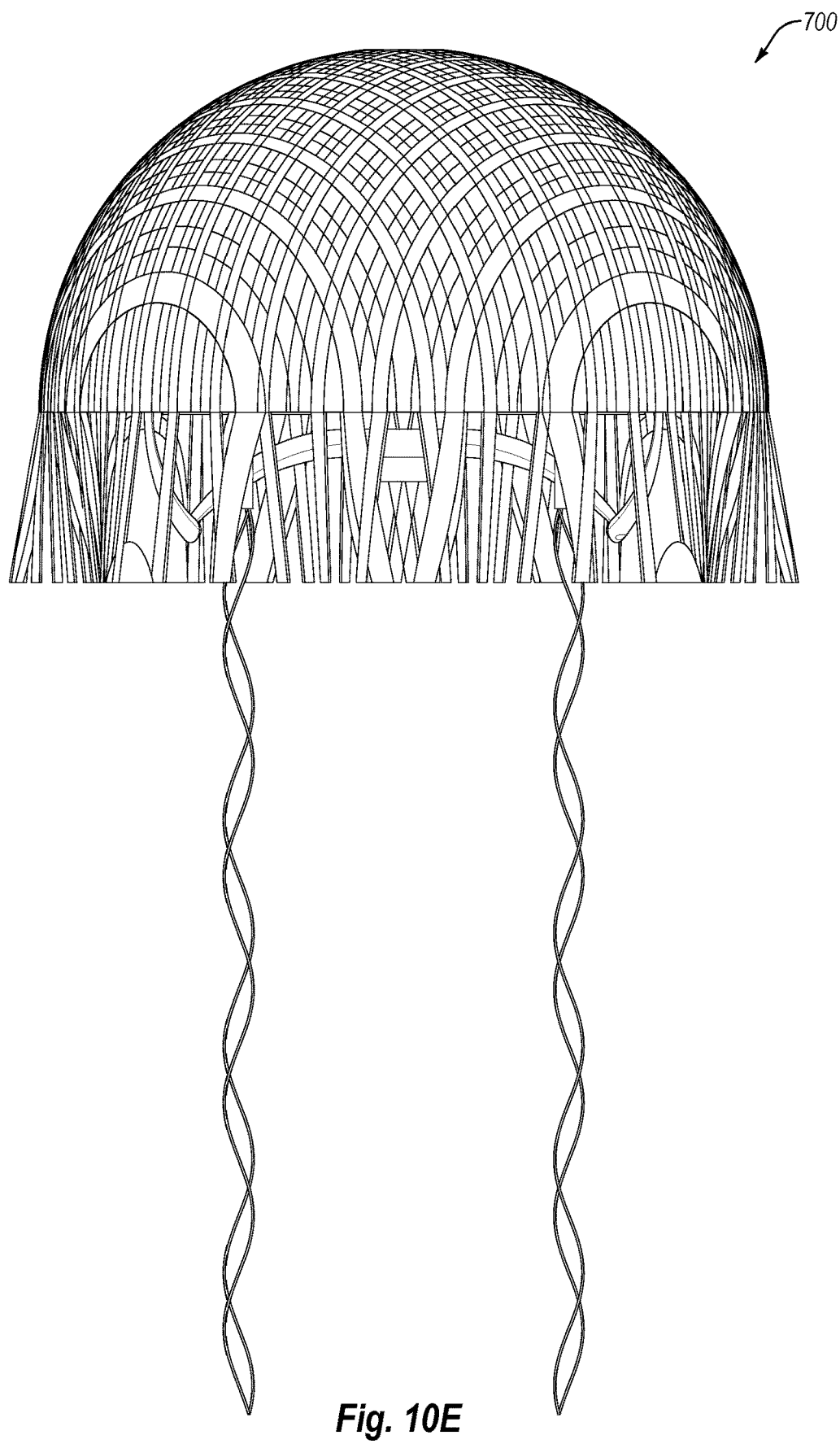
FIG. 10E is a right view of the aerial vehicle of FIG. 10A.
Figure 10F:
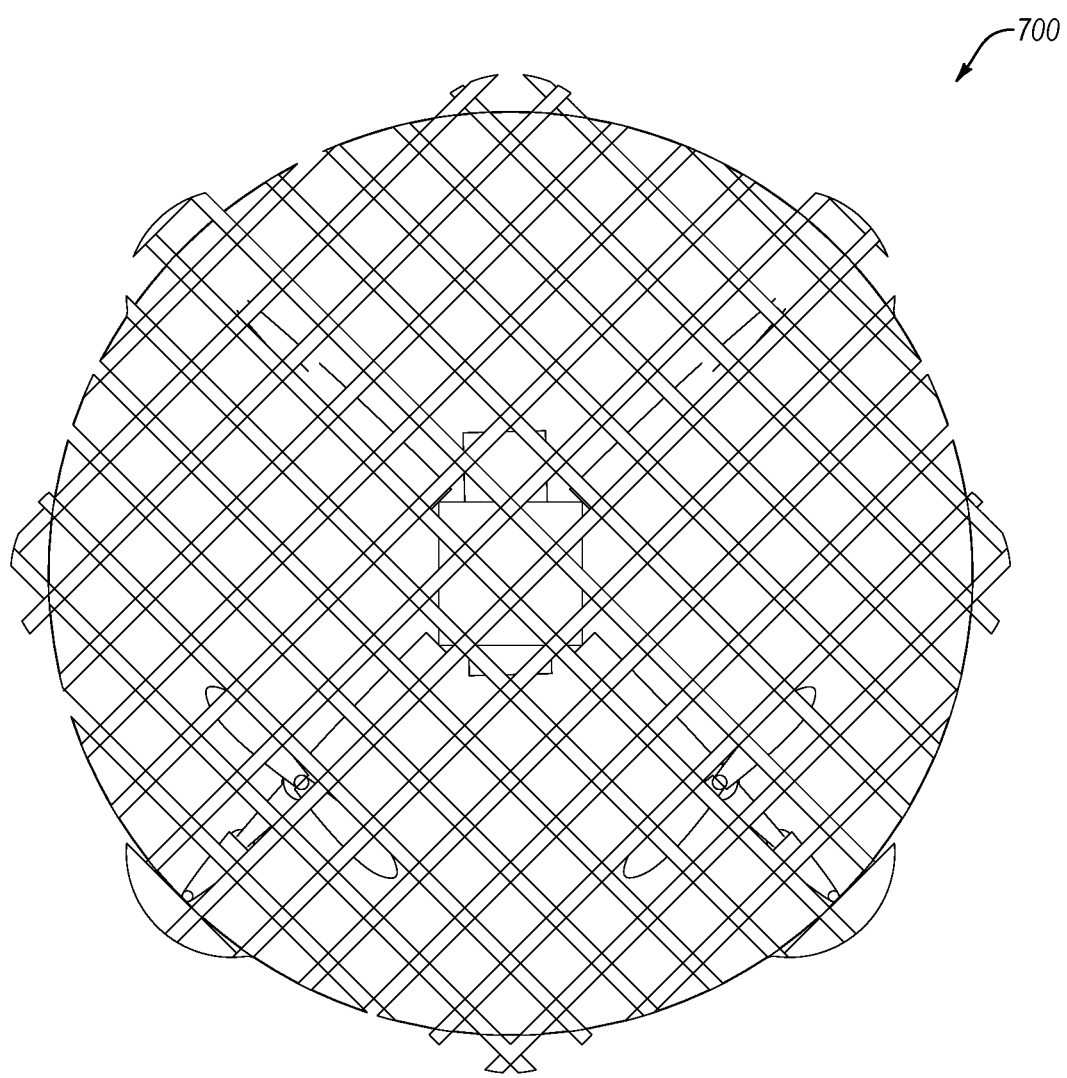
FIG. 10F is a top view of the aerial vehicle of FIG. 10A.
Figure 10G:
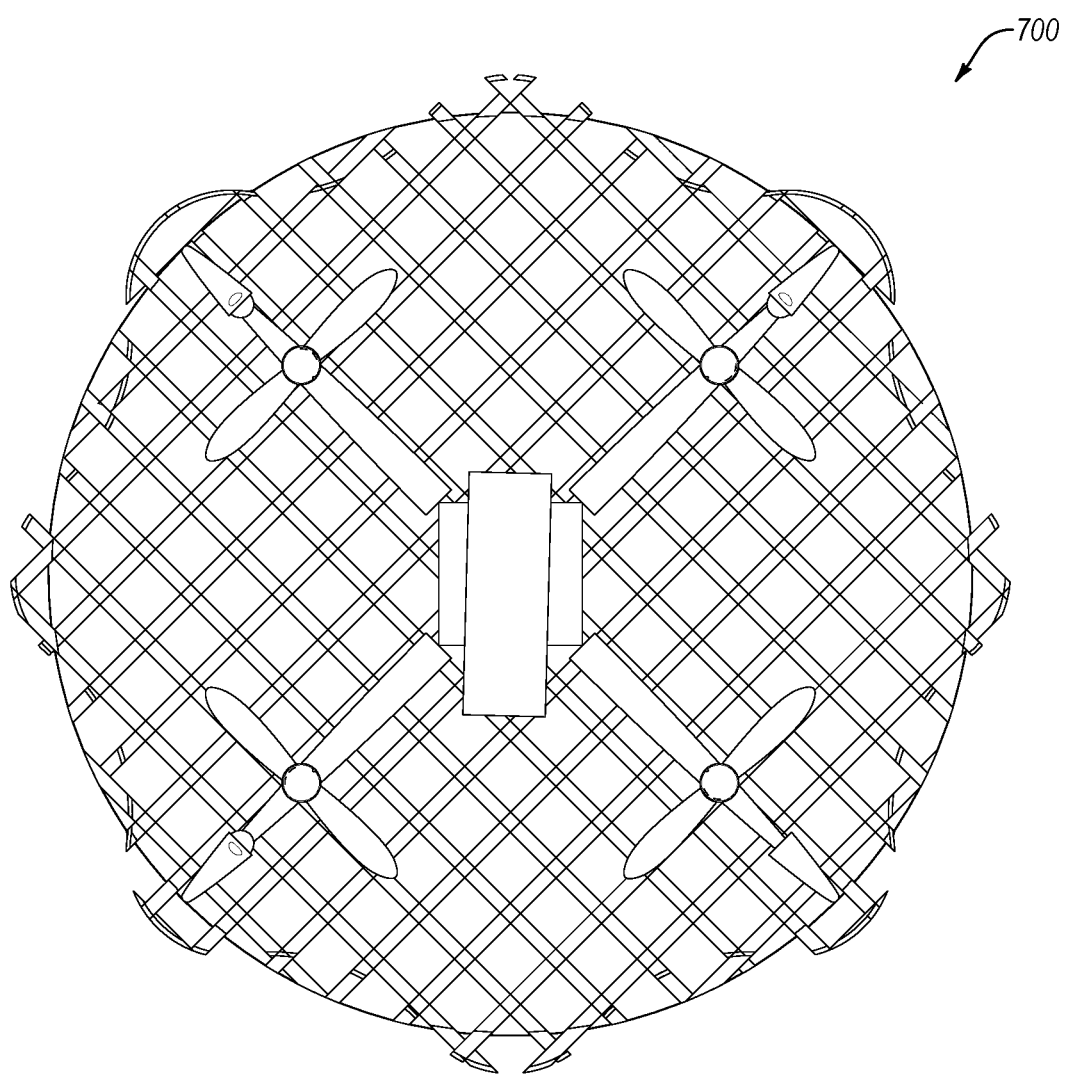
FIG. 10G is a bottom view of the aerial vehicle of FIG. 10A.

FIG. 9 depicts an aerial vehicle 700 having a body 704 and a domed support member 748 supported at least partially by an undercarriage assembly 710. The aerial vehicle 700 may include extensions 738. In some embodiments, the domed support member 748 may extend over an upper half of the aerial vehicle 700. In other embodiments, the domed support member 748 may be semispherical. In some embodiments, the domed support member 748 may include a plurality of dome struts 750. The domed support member 748 may include 2, 3, 4, 5, 6, 7, 8, or more dome struts 750, which may be spaced angularly at equal intervals. In other embodiments, the dome struts 750 may be spaced at unequal intervals.

In some embodiments, at least one of the dome struts 750 may be connected to the undercarriage assembly 710 and thereby transfer loads to the undercarriage assembly 710. For example, the dome strut 750 may transfer loads to the undercarriage assembly 710 upon an inverted impact with the ground, protecting aerodynamic propulsors 714 and/or other components of the aerial vehicle 700 contained in within the domed support member 748. In other embodiments, at least one of the dome struts 750 may be connected to a propulsor guard 740 extending about the perimeter of the aerial vehicle 700 and thereby transfer loads to the propulsor guard 740. In some embodiments, the propulsor guard 740 may then transfer at least part of the load to the undercarriage assembly 710.

In some embodiments, the domed support member 748 may provide scaffolding upon which a movable member may be positioned. As shown in FIG. 10A through FIG. 10G, a flexible cover 752 may be positioned on the domed support member 748 on the body 704. In some embodiments, the flexible cover 752 may include reinforcement (e.g., a resilient material in a grid or other connected structure) within the flexible cover 752. In other embodiments, the flexible cover 752 may be substantially uniform over the area of the flexible cover 752 and may be structurally supported by the domed support member 748. In some embodiments, the flexible cover 752 may have one or more apertures therethrough or be otherwise permeable to air flow. For example, the flexible cover 752 may be a mesh, a screen, a grate, or other material that allows air to pass from a first side of the flexible cover 752 to a second, opposing side of the flexible cover 752. The flexible cover 752 may have a skirt 754 that extends away from the domed support member 748. In some embodiments, the skirt 754 may extend away from and/or past a propulsor guard 740. The skirt 754 may be unsupported past the propulsor guard 740, allowing the skirt of the flexible cover 752 to move at least partially due to airflow through and/or past the aerial vehicle 700.

The aerial vehicle 700 may include one or more movable members 702 that extend downward from the aerodynamic propulsor 714 and/or the undercarriage assembly 710. In some embodiments, the movable member 702 may be any movable member described herein. In other embodiments, the movable member 702 may consist of a flexible member 716. The flexible member 716 may extend from the aerodynamic propulsor 714 and/or the undercarriage assembly 710 and away from the domed support member 748. The flexible member 716 may move at least partially in response to air flow from and/or through the aerodynamic propulsors 714.

FIG. 10B through FIG. 10G are a front view, a back view, a left view, a right view, a top view, and a bottom view, respectively, of the aerial vehicle 700.

Figure 11:
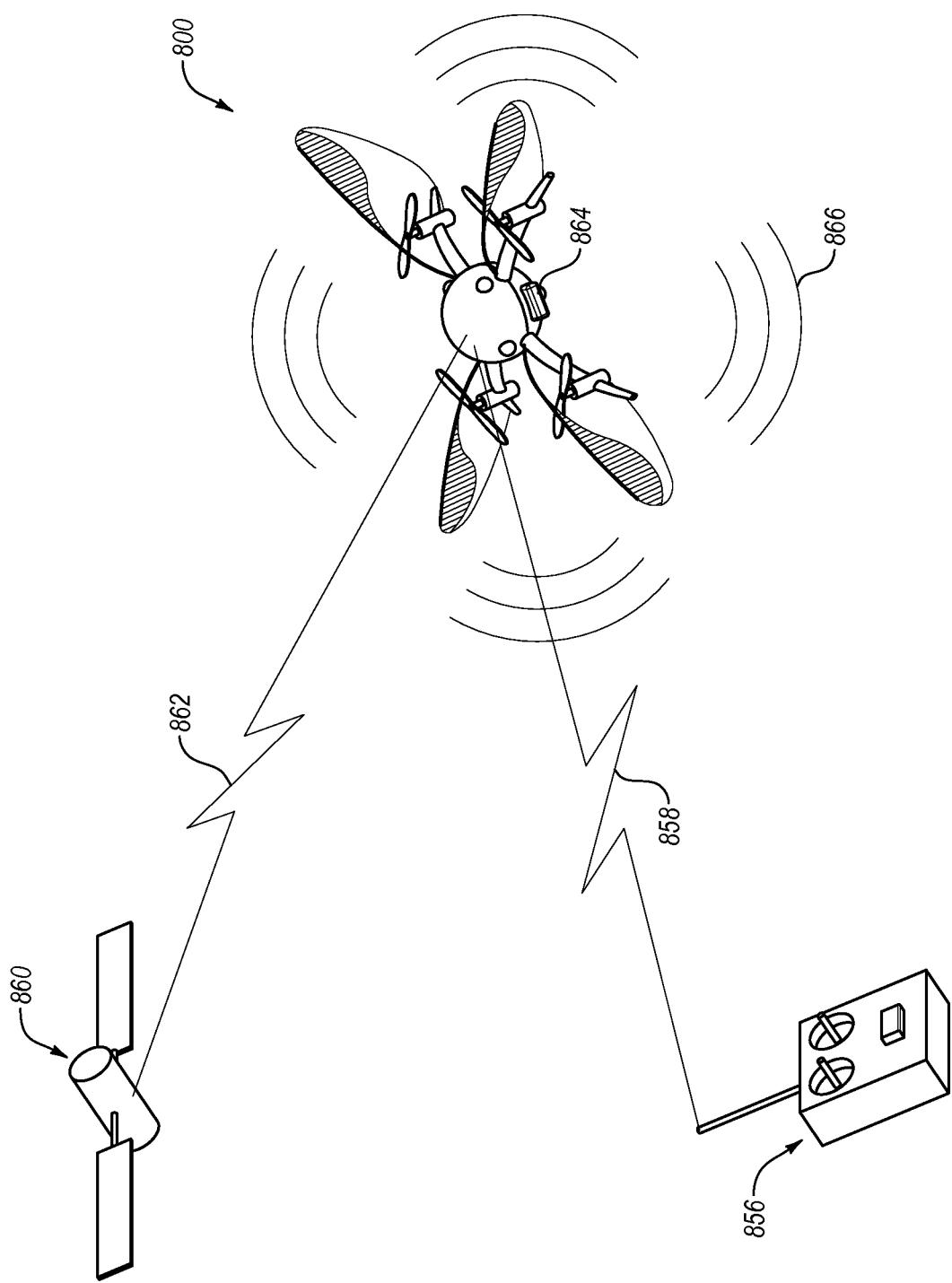
FIG. 11 is a schematic representation of an embodiment of an aerial vehicle receiving flight instructions from a plurality of sources, according to the present disclosure.

FIG. 11 shows a variety of methods of communicating with and/or guiding an aerial vehicle 800 during operation. A remote controller 856, which may be operated by a human operator, may issue flight commands 858 to the aerial vehicle 800 via a number of electromagnetic, optical, infrared, other spectra, or combinations thereof. The flight commands 858 may be received by the aerial vehicle 800. Other signals 862 indicating spatial position of the aerial vehicle 800 may be sent from a satellite 860 or other reference location to the aerial vehicle 800 via a number of electromagnetic, optical, infrared, other spectra, or combinations thereof. The aerial vehicle 800 may employ a collision avoidance system which uses position sensors 864 that send out electromagnetic waves 866 or other rangefinding signals which may be used to determine the distance to obstacles and/or individuals. For example, the aerial vehicle 800 may emit acoustic signals for determination of obstacle proximity or for announcement of flight state or health or for communication. Operator voice signals may be broadcast by acoustic emitting elements mounted within or without the aircraft body.

Figure 12:
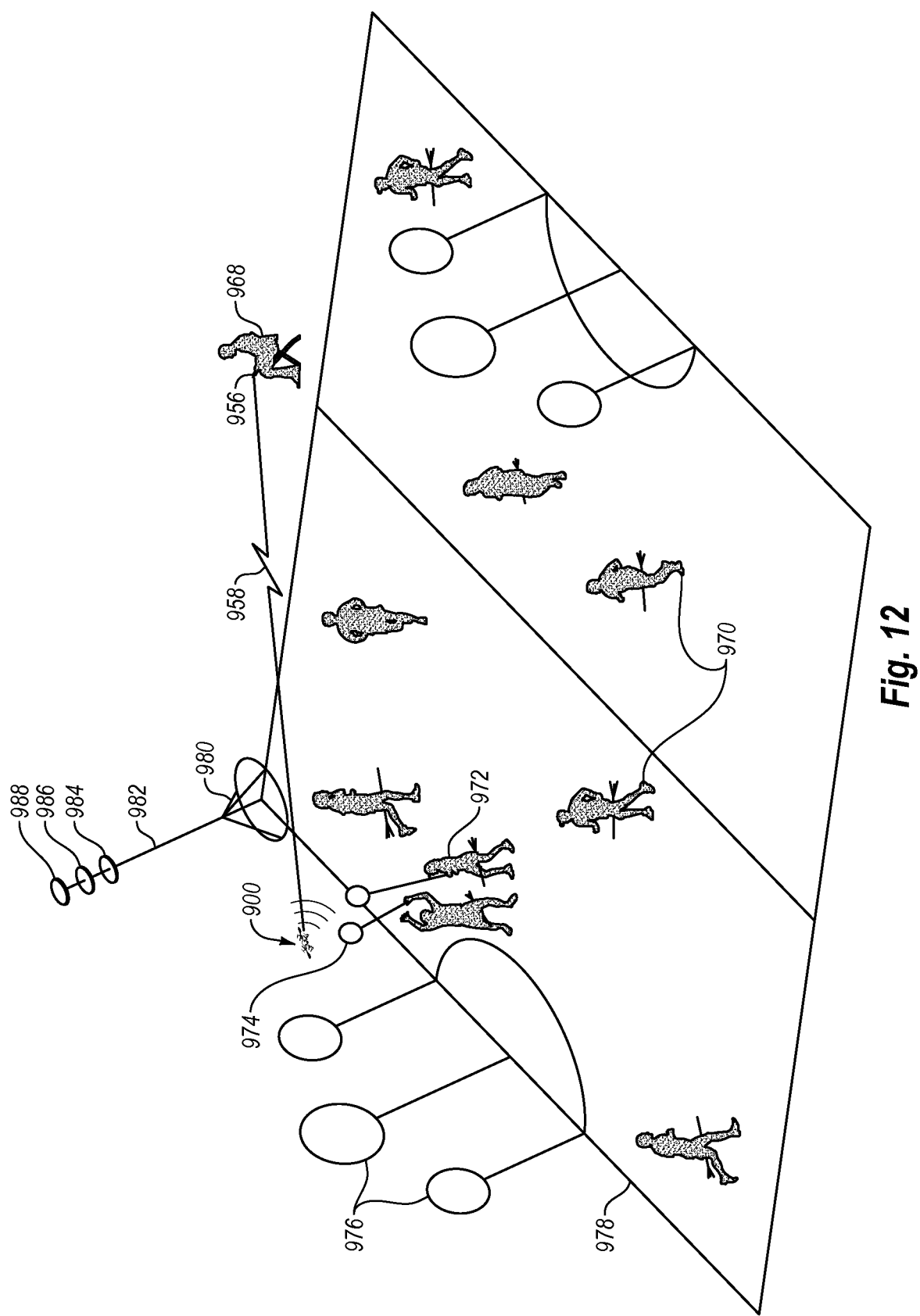
FIG. 12 is a schematic representation of a playing field and game employing an embodiment of a user-controlled aerial vehicle, according to the present disclosure.
Figure 13A:
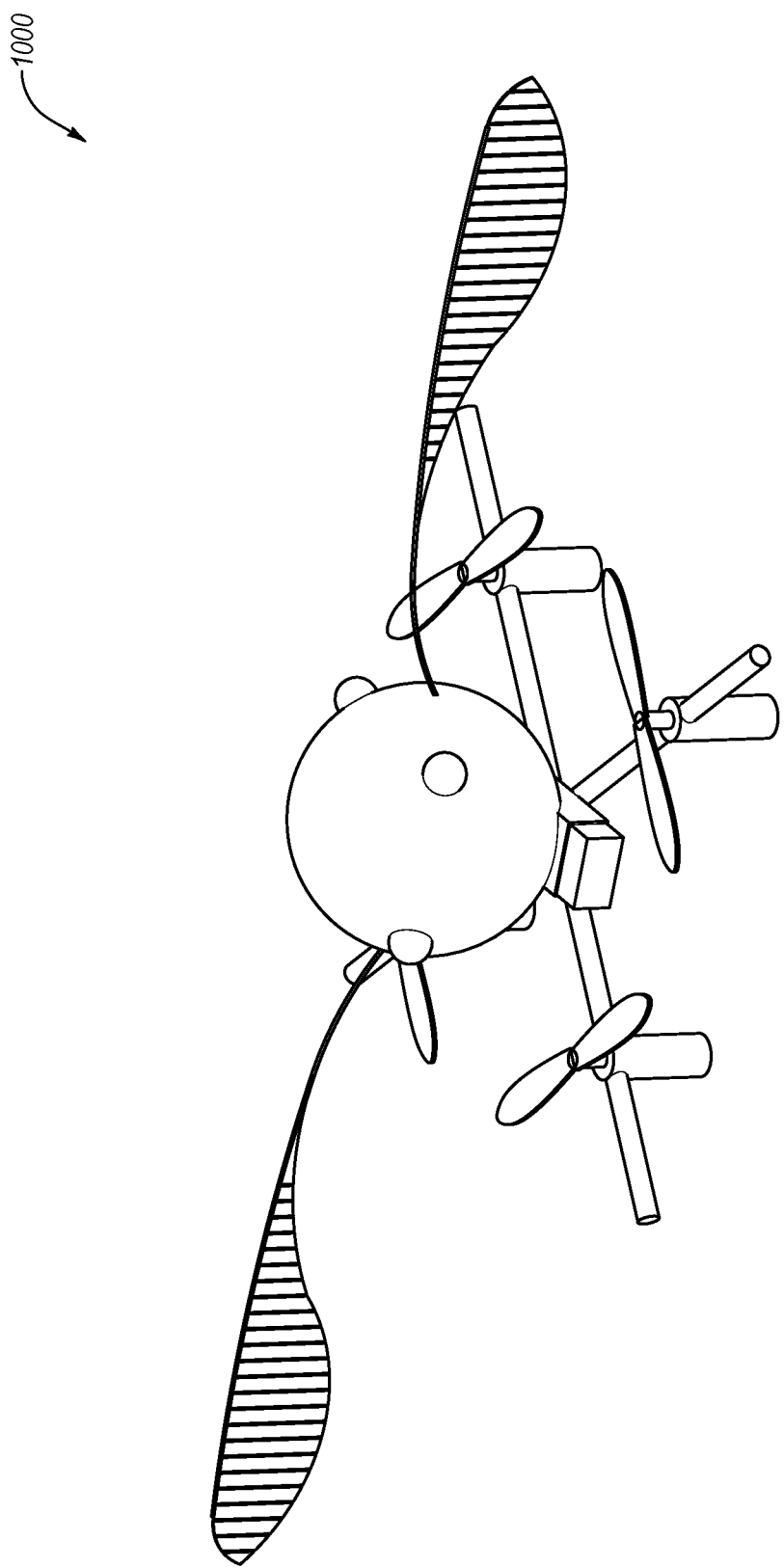
FIG. 13A is a perspective view of an aerial vehicle a plurality of movable members affixed to a body and positioned between aerodynamic propulsors, according to the present disclosure.
Figure 13B:
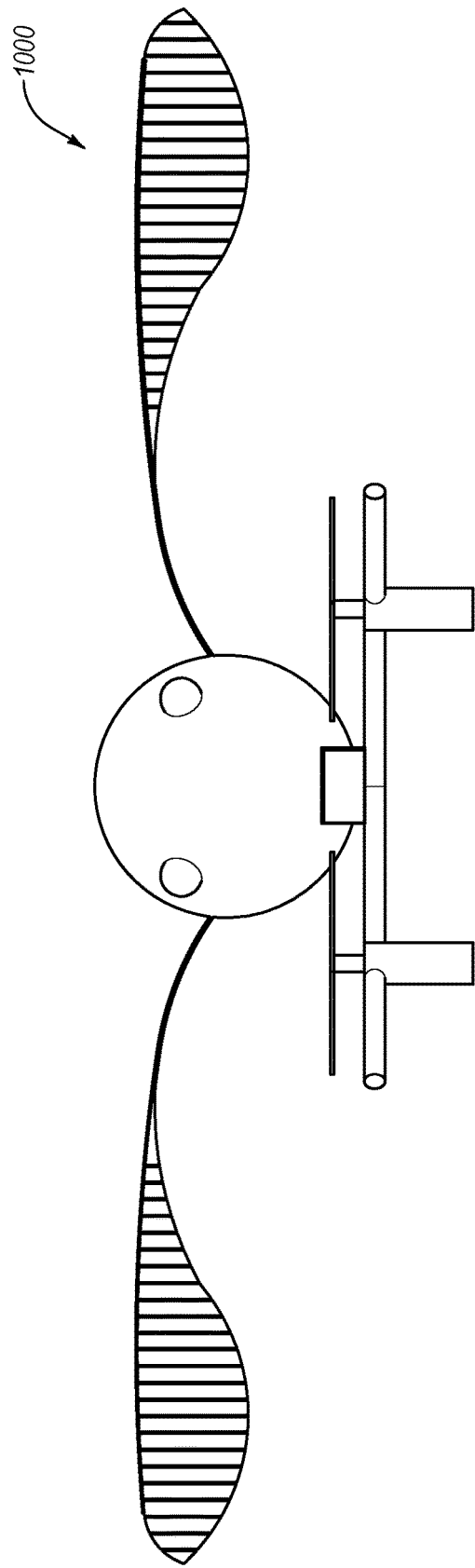
FIG. 13B is a front view of the aerial vehicle of FIG. 13A.
Figure 13C:
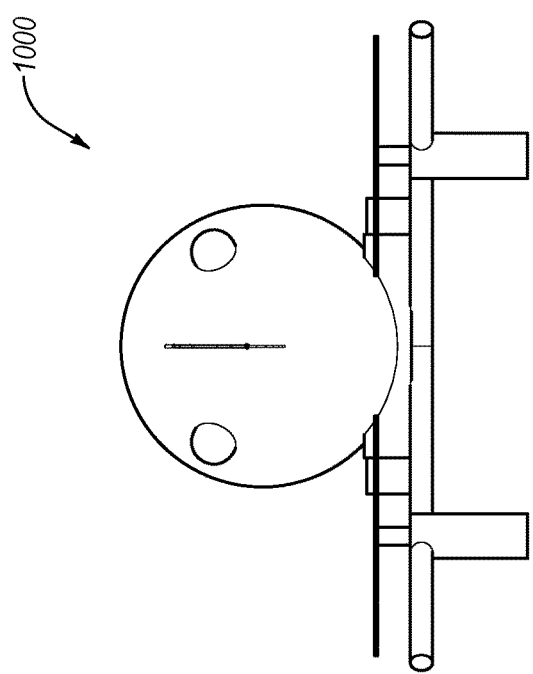
FIG. 13C is a side view of the aerial vehicle of FIG. 13A.
Figure 13D:
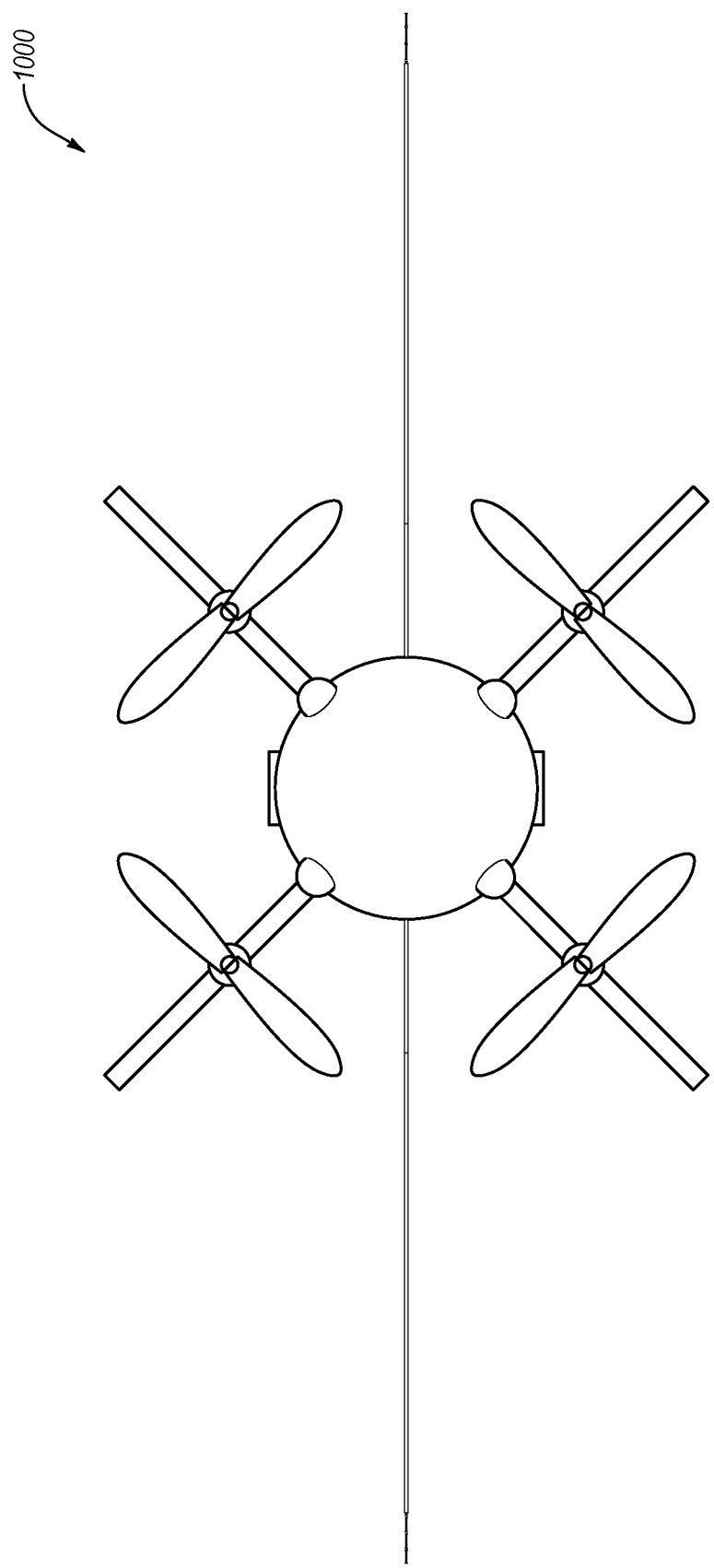
FIG. 13D is a top view of the aerial vehicle of FIG. 13A.
Figure 13E:
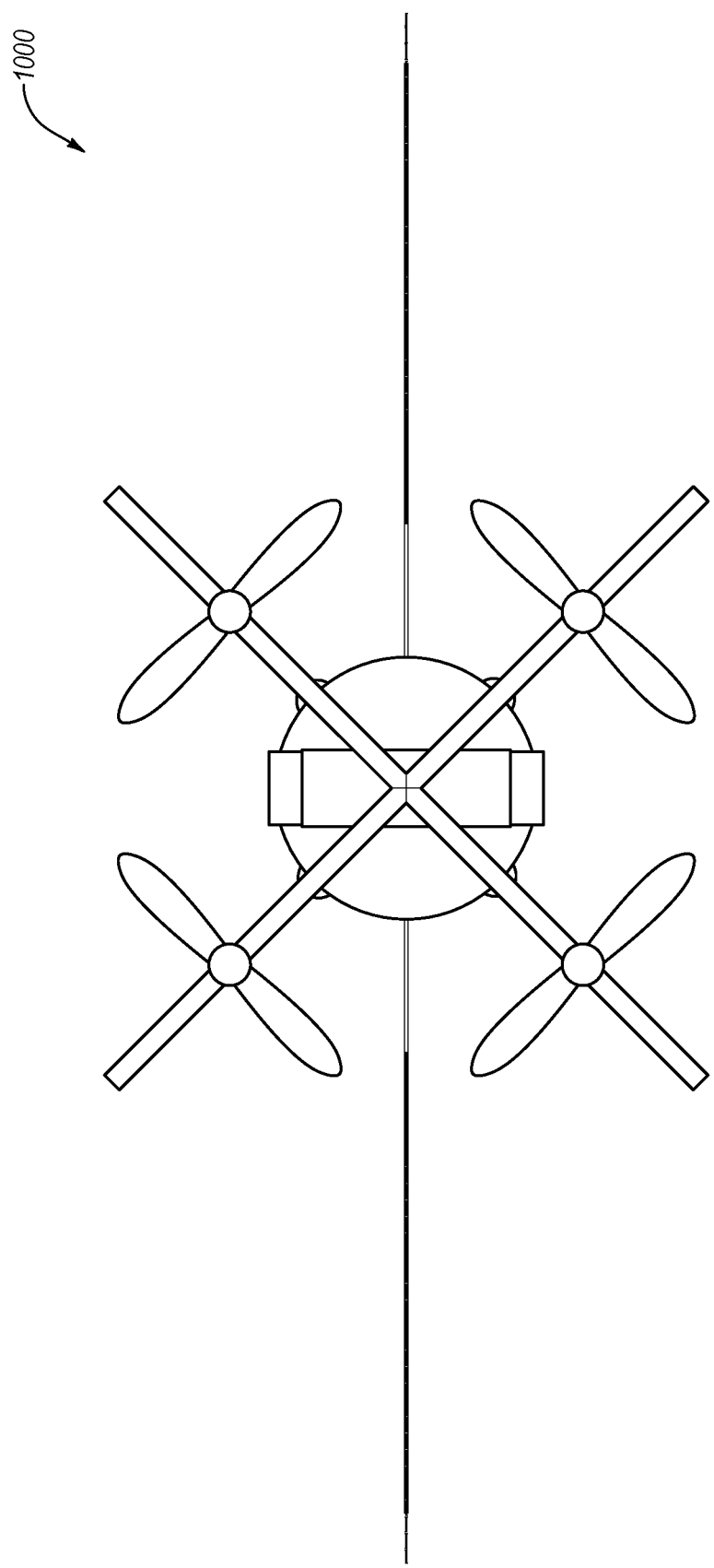
FIG. 13E is a bottom view of the aerial vehicle of FIG. 13A.
Figure 14A:
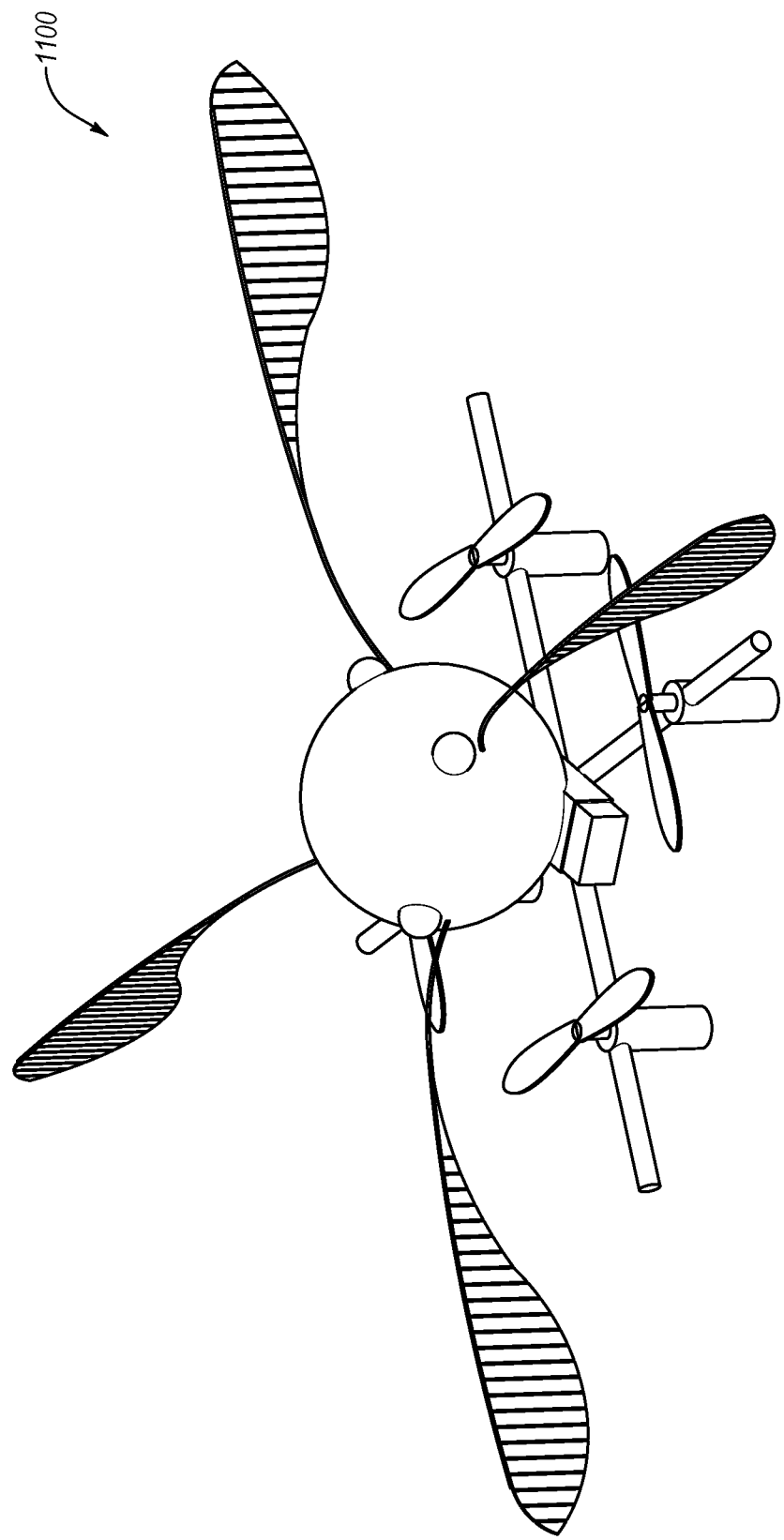
FIG. 14A is a perspective view of an aerial vehicle a plurality of movable members affixed to a body and positioned in line with aerodynamic propulsors, according to the present disclosure.
Figure 14D:
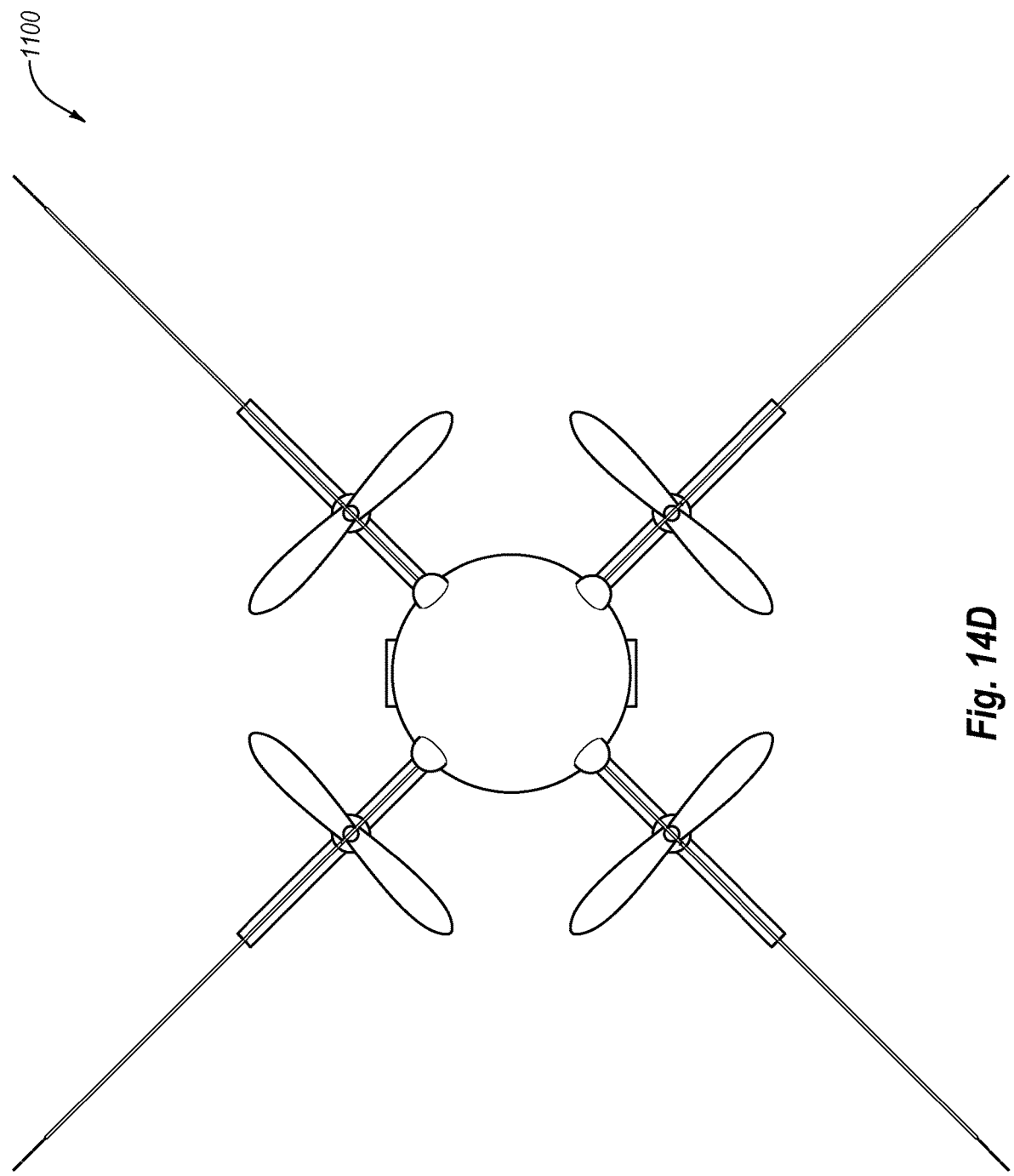
FIG. 14D is a top view of the aerial vehicle of FIG. 14A.
Figure 14E:
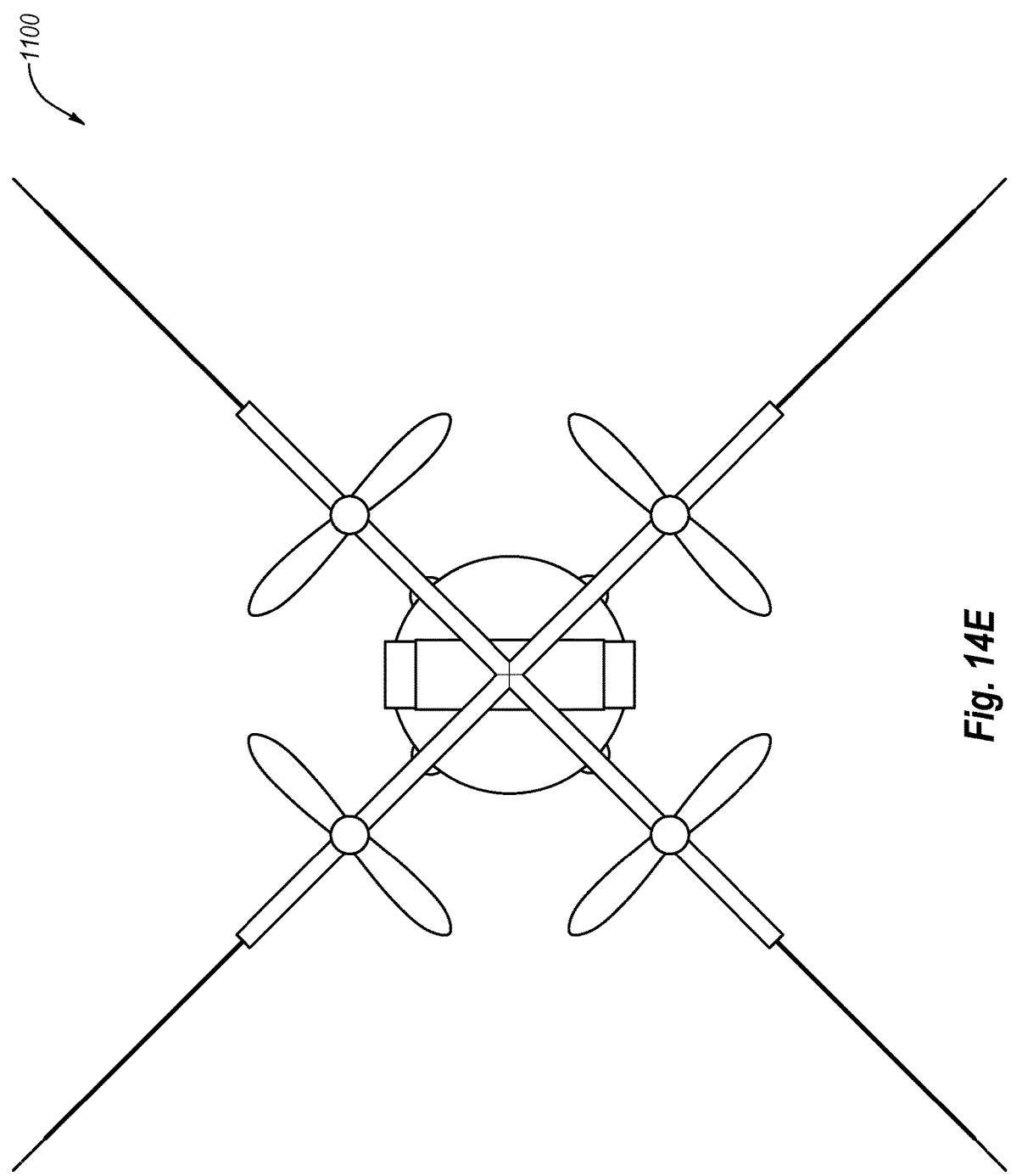
FIG. 14E is a bottom view of the aerial vehicle of FIG. 14A.

FIG. 12 shows an embodiment of a use for an aerial vehicle 900, according to the present disclosure. The aerial vehicle 900 may be flown under radio frequency commands generated by the controller 956, which are sent via electromagnetic waves 958 to the aerial vehicle 900. The aircraft operator 968 may fly the aircraft under prescribed rules and patterns to avoid contact and/or capture or to strategically maneuver players 970 into or away from a certain part of the field. The players 970 may have a variety of objectives. Among the competitors, some specialized players 972 may work to capture, touch, or attain a predetermined proximity to the aerial vehicle 900. Several opponents may use their hands and/or have nets 974 or other equipment, which may be used to capture the aerial vehicle 900. The field may include features like a variety of vertically oriented goals 976 and a boundary 978. To prevent the aerial vehicle 900 from gaining too much altitude, an internal altimeter may be used in some embodiments, which may be barometric, acoustic and/or radio frequency based, such as one included in an electronics package, as described herein. Another method of preventing excessive vertical excursions is to use a tower 980 which has a mast 982 and a set of visible and/or IR fanned laser disks which cover the field. As the aircraft flies from low to high, the first laser disk 984 may illuminate and/or may illuminate the aerial vehicle 900. The aircraft operator 968 may then see the reflection and refraction on the aerial vehicle 900 and know that the aerial vehicle 900 is too high. As the aerial vehicle 900 attains more altitude relative to the tower 980, a second disk 986, and third disk 988 having brighter and/or different colors may be used to indicate other altitudes. Scoring may be via any number of means and the game may be played indoors or out.

FIG. 13A through FIG. 13E are a perspective view, a front view, a side view, a top view, and a bottom view, respectively, of an aerial vehicle 1000 having a plurality of movable members extending from a body and positioned angularly between aerodynamic propulsors.

FIG. 13A through FIG. 13E are a perspective view, a front view, a side view, a top view, and a bottom view, respectively, of an aerial vehicle 1100 having a plurality of movable members extending from a body and positioned angularly aligned with aerodynamic propulsors.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 10% of, within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

Although the preceding description has been described herein with reference to particular means, materials and embodiments, it is not intended to be limited to the particulars disclosed herein; rather it extends to all functionally equivalent structures, methods and uses, such as are within the scope of the appended claims.

What is claimed is:

1. An aerial vehicle, comprising:
a body having a longitudinal axis;
at least one motor;
at least three aerodynamic propulsors driven by at least one motor, the at least three aerodynamic propulsors positioned relative to the longitudinal axis and configured to provide lifting thrust, pitch, yaw and roll control;
a plurality of support members structurally supporting the at least three aerodynamic propulsors relative to the body; and
one or more movable members affixed to the body or support members configured as a strike guard for the at least three aerodynamic propulsors and configured to flutter in response to aerodynamic forces during flight, the one or more movable members configured to move at least within a plane orthogonal to the longitudinal axis.

2. The aerial vehicle of claim 1, wherein at least one of the one or more movable members is radially aligned relative to the longitudinal axis with at least one of the at least three aerodynamic propulsors.

3. The aerial vehicle of claim 1, wherein at least one of the one or more movable members is radially positioned relative to the longitudinal axis between at least two of the at least three aerodynamic propulsors.

4. The aerial vehicle of claim 1, wherein at least one of the one or more movable members is further from the body than at least one of the at least three aerodynamic propulsors.

5. The aerial vehicle of claim 1, wherein at least one of the one or more movable members is longitudinally positioned aft of at least one of the at least three aerodynamic propulsors.

6. The aerial vehicle of claim 1, wherein at least one of the plurality of support members is one of the one or more movable members.

7. The aerial vehicle of claim 1, wherein at least one of the one or more movable members includes a flexible member that resiliently bends during operation of the aerial vehicle.

8. The aerial vehicle of claim 1, wherein at least one of the one or more movable members is movably mounted to the body or to one support member of the plurality of support members.

9. The aerial vehicle of claim 1, wherein at least one of the movable members has a first end and a second end, both the first end and the second end being connected to the body or one of the plurality of support members.

10. The aerial vehicle of claim 1, the one or more movable members affixed to one or more of the plurality of support members between the body and the at least three aerodynamic propulsors.

11. The aerial vehicle of claim 1, the one or more movable members further comprising a flexible member and a sheet extending from the flexible member.

12. An aerial vehicle, comprising:
a body having a longitudinal axis;
an undercarriage assembly having a plurality of support members and a longitudinal axis extending therethrough;
at least one motor;
at least three aerodynamic propulsors driven by at least one motor and structurally supported by the undercarriage assembly, the at least three aerodynamic propulsors positioned relative to the longitudinal axis and configured to provide lifting thrust, pitch, yaw and roll control;
an electronics package including a stability augmentation system in data communication with the at least one motor; and
one or more movable members affixed to the undercarriage assembly configured as a strike guard for the at least three aerodynamic propulsors and configured to flutter in response to aerodynamic forces during flight, the one or more movable members configured to move at least within a plane orthogonal to the longitudinal axis.

13. The aerial vehicle of claim 12, wherein the electronics package is at least partially vibrationally isolated from the one or more movable members.

14. The aerial vehicle of claim 12, wherein the one or more movable members include a reflective coating to increase visibility.

15. The aerial vehicle of claim 12, further comprising a propulsor guard extending around at least a portion of a lateral perimeter relative to the longitudinal axis.

16. The aerial vehicle of claim 15, wherein at least one of the one or more movable members is affixed to the propulsor guard.

17. The aerial vehicle of claim 15, further comprising a domed support member at least partially supported by the propulsor guard.

18. The aerial vehicle of claim 17, further comprising a flexible cover supported by the domed support member, wherein the flexible cover radially encloses the at least three aerodynamic propulsors and has a plurality of apertures therethrough to allow airflow through the least three aerodynamic propulsors.

19. The aerial vehicle of claim 15, wherein the propulsor guard is in electrical communication with the electronics package, the electronics package configured to stop the at least three aerodynamic propulsors when the propulsor guard contacts other objects.

20. The aerial vehicle of claim 12, wherein the aerial vehicle is built to be repeatedly captured and handled by sports competitors while playing a competitive game whereby the aerial vehicle is to be captured by hand and/or by net.

21. An aerial vehicle, comprising:
a body having a longitudinal axis;
an undercarriage assembly having a plurality of support members and a longitudinal axis extending therethrough;
at least one motor;
at least three aerodynamic propulsors driven by at least one motor and structurally supported by the undercarriage assembly, the at least three aerodynamic propulsors positioned relative to the longitudinal axis and configured to provide lifting thrust, pitch, yaw and roll control;

a propulsor guard connected to the undercarriage assembly and extending circumferentially about a perimeter of the undercarriage assembly;
a domed support member connected to the undercarriage assembly and configured to transfer loads to the undercarriage assembly;
an electronics package including a stability augmentation system in data communication with the at least one motor; and
one or more movable members affixed to the undercarriage assembly configured as a strike guard for the at least three aerodynamic propulsors and configured to flutter in response to aerodynamic forces during flight, the one or more movable members configured to move at least within a plane orthogonal to the longitudinal axis.

22. The aerial vehicle of claim 21, the one or more movable members extending longitudinally aft of the undercarriage assembly.

* * * * *